US009359003B2

(12) United States Patent
Ito

(10) Patent No.: US 9,359,003 B2
(45) Date of Patent: Jun. 7, 2016

(54) CLUTCH DEVICE AND STEERING DEVICE

(71) Applicant: TOYOTA JIDOSHA KABUSHIKI KAISHA, Toyota-shi, Aichi-ken (JP)

(72) Inventor: Koichi Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/437,874

(22) PCT Filed: Nov. 5, 2012

(86) PCT No.: PCT/JP2012/007077
§ 371 (c)(1),
(2) Date: Apr. 23, 2015

(87) PCT Pub. No.: WO2014/068626
PCT Pub. Date: May 8, 2014

(65) Prior Publication Data
US 2015/0291206 A1    Oct. 15, 2015

(51) Int. Cl.
*B62D 5/00* (2006.01)
*F16D 11/16* (2006.01)
*F16D 27/09* (2006.01)
*F16D 28/00* (2006.01)
*F16D 48/06* (2006.01)
*F16D 23/12* (2006.01)

(52) U.S. Cl.
CPC ................ *B62D 5/003* (2013.01); *F16D 11/16* (2013.01); *F16D 27/09* (2013.01); *F16D 28/00* (2013.01); *F16D 48/06* (2013.01); *F16D 2023/123* (2013.01); *F16D 2500/3021* (2013.01); *F16D 2500/31* (2013.01); *F16D 2500/5085* (2013.01); *F16D 2500/50858* (2013.01); *F16D 2500/525* (2013.01); *F16D 2500/7041* (2013.01)

(58) Field of Classification Search
CPC .............................. B62D 5/003; F16D 11/16
USPC ................. 180/405, 407, 402, 444; 192/43.1
See application file for complete search history.

(56) References Cited

U.S. PATENT DOCUMENTS

| 6,138,788 | A | * | 10/2000 | Bohner | B62D 5/006 |
| | | | | | 180/402 |
| 9,109,642 | B2 | * | 8/2015 | Kitayama | F16D 28/00 |
| 2005/0000749 | A1 | * | 1/2005 | Sato | F16D 41/086 |
| | | | | | 180/402 |
| 2005/0082108 | A1 | * | 4/2005 | Husain | B62D 5/003 |
| | | | | | 180/402 |
| 2006/0278487 | A1 | | 12/2006 | Pawley et al. | |
| 2015/0197275 | A1 | * | 7/2015 | Ito | F16D 11/16 |
| | | | | | 180/443 |

FOREIGN PATENT DOCUMENTS

| JP | 2008-195187 A | 8/2008 |
| JP | 2011-169344 A | 9/2011 |

* cited by examiner

*Primary Examiner* — Tony Winner
(74) *Attorney, Agent, or Firm* — Oliff PLC

(57) ABSTRACT

A clutch apparatus is configured such that a first mode, a second mode and a third can be switched among these three modes. In the first mode, the rotating force is not transmitted between the steering-wheel-side housing and the tire-side housing. In the second mode, the steering-wheel-side housing and the tire-side housing are being mutually locked in place and, in this locked state, the rotating force can be transmitted to for the rotation in the both directions. In the third mode, the transmission of the rotating force can be canceled such that while the rotating force can be transmitted, between the steering-wheel-side housing and the tire-side housing, relative to the rotation in one direction, the rotation of either the steering-wheel-side housing or the tire-side housing in the other direction is allowed.

8 Claims, 12 Drawing Sheets

CLUTCH DEVICE AND STEERING DEVICE

CROSS REFERENCE TO RELATED APPLICATIONS

This application is based upon and claims the benefit of priority from the prior International Patent Application No. PCT/JP2012/007077, filed Nov. 5, 2012, the entire content of each of which is incorporated herein by reference.

TECHNICAL FIELD

The present invention relates to a clutch apparatus and it particularly relates to a clutch apparatus used for a vehicle steering apparatus.

BACKGROUND TECHNOLOGY

In recent years, a system for the steering of an automobile, which is so-called a "steer-by-wire system", has been developed for practical use in variety of manners. Where the steer-by-wire system is used, it is generally practiced that either one of the following mechanisms is prepared in advance in order to secure the steering capability just in case a failure or defect occurs in the system. That is, prepared are either a coupling mechanism for mechanically coupling a steering wheel (handwheel) with turning wheels, separately from the steer-by-wire system, or its equivalent mechanism, which is so-called a fail-safe mechanism.

Also, the steer-by-wire system detects an input entered by a vehicle's driver, such as a torque and a steering angle, by sensors. And the steer-by-wire system combines this detected input with the information acquired from other sensors provided in the vehicle, and thereby derives a steering angle suitable for the running condition of the vehicle. Then the steer-by-wire system sends this steering command value to a steering actuator so as to actually steer the wheels (i.e., the turning wheels). The output of a motor used as an actuator for turning the wheels is determined on the assumption of a steering wheel operation (during stationary steering) at the time when the force required for the turning of the wheels is the maximum while the vehicle is being stopped. For this reason, a high-output and large-sized motor is required then.

In the light of this, a vehicle steering apparatus is proposed (see Patent Document 1 listed in the following Related Art Documents) in order that a small-sized, low-priced and low-output motor can be used. That is, in this vehicle steering apparatus, a clutch mechanism is coupled during stationary steering and thereby a steering mechanism and a turning mechanism are mechanically coupled together. And the drive of a turning power motor and a reaction-force motor is controlled so as to turn the wheels. By employing this vehicle steering apparatus, it seems that the output of the turning power motor during stationary steering can be suppressed and the size of the turning power motor can be made small.

RELATED ART DOCUMENTS

Patent Documents

[Patent Document 1] Japanese Patent Application Publication No. 2008-195187.

SUMMARY OF THE INVENTION

Problems to be Solved by the Invention

In the above-described vehicle steering apparatus, however, during stationary steering, the clutch mechanism is coupled and the output of the turning power motor is assisted by driving the reaction-force motor. Accordingly, when a necessary turning force in this state drops abruptly, a large turning force, which has been applied to turn the tires so far, is shifted to a steering shaft side. This may possibly bring about a so-called self-steer state where the steering shaft is moved more than necessary. For this reason, there is still room for improvement in the feeling sensed by the driver when a steering operation is done.

The present invention has been made in view of the foregoing circumstances, and a purpose thereof is to provide a technology capable of improving the steering feeling in a steering apparatus.

Means for Solving the Problem

In order to resolve the above-described problems, a clutch apparatus according to one embodiment of the present invention switches transmission and cutoff of a rotating force between two rotating shafts, and the clutch apparatus includes: a first rotating shaft formed circumferentially such that a plurality of grooves are formed mutually at intervals in an inner or outer circumference; a second rotating shaft arranged such that the second rotating shaft is placed coaxially with the first rotating shaft and such that at least part of the second rotating shaft overlaps with the first rotating shaft; a plurality of engagement portions arranged in a circumferential direction of the second rotating shaft such that the plurality of engagement portions are placed mutually at intervals, the engagement portions being so provided in the second rotating shaft as to be movable in a radial direction of the second rotating shaft; an advancing/retreating mechanism that advances and retreats the engagement portions toward and away from the grooves; and a regulating mechanism that regulates movement of at least one of the engagement portions, when the advancing/retreating mechanism moves the plurality of engagement portions toward the grooves. The plurality of engagement portions and the plurality of grooves are so configured as to achieve a first engagement state and a second engagement state, the first engagement state being a state of the engagement portions and the grooves where the two rotating shafts are locked with each other, with a backlash, which is less than or equal to a first predetermined amount, such that a predetermined combination of two engagement portions enter their corresponding grooves in the plurality of grooves by the advancing/retreating mechanism, whereby the rotating force is transmittable for a rotation in both directions, and the second engagement state being a state thereof where a relative rotation having a second predetermined amount, which is greater than the first predetermined amount, is allowed between the two rotating shafts such that the advancing/retreating mechanism restricts a movement of one of the predetermined combination of two engagement portions into the groove.

By employing this embodiment, the two rotating shafts are locked with each other with the backlash, which is less than or equal to the first predetermined amount. And this embodiment can realize the first engagement state, where the rotating force is transmittable to the rotation in both directions, and the second engagement state, where the relative rotation having the second predetermined amount, which is greater than the first predetermined mount, is permitted between the two rotating shafts. Thus, locking the two shafts with each other transmits the rotating force for the rotation in both directions, in the event that, for example, an abnormality occurs in the system where the clutch apparatus is used. Also, suppose that the rotation of one rotating shaft is to be assisted by using the rotating force acting on the other rotating shaft even though the system used in the clutch apparatus operates normally. Then, in this case, permitting the relative rotation having the second predetermined amount larger than the first predetermined amount enables the rotating force to be not only transmitted by using the rotation in one direction and but also cut off when rotated in the other direction. In this manner, the use of the above-described clutch apparatus for a vehicle steering apparatus allows the two rotating shafts to be rotated relatively to each other in a situation where, for example, the assist control for the rotation is no longer required. As a result, the transmission of the rotating force is quickly cut off and therefore the steering feeling can be improved.

Here, the first predetermined amount may be set in consideration of the component tolerances and the precision required for the mechanical connection of components, for instance. Or the first predetermined amount may be set in consideration of a backlash permitted in terms of the operability of a system (e.g., a steering apparatus) where a clutch apparatus is used, and so forth. Also, the second predetermined amount, which is a value larger than the first predetermined amount, may be an approximately set value, by which a first state of the two rotating shafts being connected and a second state thereof being not connected can be clearly distinguished between the first and second states. In other words, the second predetermined amount is not a value having the magnitude of a backlash or looseness between the components but may be suitably expressed as a value set for the purpose of realizing an intended operation (e.g., a unidirectional clutch connection).

The plurality of engagement portions may include: a first engagement portion that enters a first groove, which is any one of the plurality of grooves, regardless of a difference in rotational phases between the first rotating shaft and the second rotating shaft, when the advancing/retreating mechanism moves the plurality of engagement portions toward the plurality of grooves; and a second engagement portion that enters a second groove, which differs from the first groove, when the first engagement portion moves in either a clockwise or counterclockwise direction with the first engagement portion having entered the first groove. The first engagement portion may be configured such that, while the first engagement portion and the second engagement portion have entered their corresponding grooves, a backlash between the first engagement portion and a lateral surface, which is one of two lateral surfaces of the first groove, on one rotation direction side near the first engagement portion, is less than or equal to the first predetermined amount. By employing this embodiment, a separate state (disconnected state), where the rotating force is not transmitted in between the first rotating shaft and the second rotating shaft, can be set by retreating the engagement portions from the grooves by using the advancing/retreating mechanism. On the other hand, when the first rotating shaft is rotated in one rotation direction in a state where the rotating shaft and the second rotating shaft are connected to each other by the advancing/retreating mechanism, the first engagement portion is engaged with a lateral surface, which is one of two lateral surfaces of the first groove, on the other rotation direction side. Thus, the rotating force can be quickly transmitted to the second rotating shaft with almost no backlash. Also, when the first rotating shaft is rotated in the other rotation direction, the second engagement portion is engaged with a lateral surface, which is one of two lateral surfaces of the second groove, on one rotation direction side. Thus, the rotating force can be quickly transmitted to the second rotating shaft with almost no backlash.

The plurality of engagement portions may include: a first engagement portion that enters a first groove, which is any one of the plurality of grooves regardless of a difference in rotational phases between the first rotating shaft and the second rotating shaft, when the advancing/retreating mechanism moves the plurality of engagement portions toward the grooves; and a second engagement portion that enters a second groove, which differs from the first groove, when the first engagement portion moves in either a clockwise or counterclockwise direction, with the first engagement portion having entered the first groove, and is engaged with a lateral surface, which is one of two lateral surfaces of the first groove, on one rotation direction side. The second engagement portion may be configured such that when the second engagement portion enters the second groove, the second engagement is engaged, with the backlash, which is less than or equal to the first predetermined amount, onto a lateral surface, which is one of two lateral surfaces of the second groove, on the other rotation direction side. By employing this embodiment, a separate state (disconnected state), where the rotating force is not transmitted in between the first rotating shaft and the second rotating shaft, can be set by retreating the engagement portions from the grooves by using the advancing/retreating mechanism. On the other hand, when the first rotating shaft is rotated in one rotation direction in a state where the first rotating shaft and the second rotating shaft are connected to each other by the advancing/retreating mechanism, the first engagement portion is engaged with a lateral surface, which is one of two lateral surfaces of the first groove, on the other rotation direction side. Thus, the rotating force can be quickly transmitted to the second rotating shaft with almost no backlash. Also, when the first rotating shaft is rotated in the other rotation direction, the second engagement portion is engaged with a lateral surface, which is one of two lateral surfaces of the second groove, on one rotation direction side. Thus, the rotating force can be quickly transmitted to the second rotating shaft with almost no backlash.

The advancing/retreating mechanism may include: an actuator driven by electricity; and a biasing member that biases the engagement portion toward the groove. An operation of the actuator, which is turned on, may cause the engagement portion to be retreated from the groove by a force, which is larger than the biasing force of the biasing member; and when the actuator is turned off, the first engagement portion may enter the first groove by the biasing force of the biasing member. Thereby, at a time of emergency when the power to the actuator is disconnected, the first engagement portion enters the first groove, so that the first shaft and the second shaft can be connected together promptly.

The actuator may be a rotary solenoid, and the advancing/retreating mechanism may further include a conversion mechanism for converting a rotary motion of the rotary solenoid so as to advance and retreat the engagement portion. Thereby, the length of the clutch apparatus in a shaft direction can be suppressed.

The engagement portions and the grooves may be so provided to satisfy $P=360/n$, $B1 \approx W+(\delta \times (Nx-1))$, and $\delta = P/N$, where n indicates the number of grooves (the plurality n of the grooves), P indicates a pitch of the grooves, N indicates the number of engagement portions (the plurality N of the engagement portions), Nx indicates the number of engagement portions entering a plurality of the grooves, W indicates width of the engagement portion, B1 indicates width of the groove, B2 indicates a distance between the groove and a groove adjacent thereto, and $\delta$ indicates a shifted angle formed when the engagement portion is engaged into the groove. Thereby, a design can be implemented where, for example, the shifted or deviated angle, which may occur at the time of the connection, has been taken into consideration.

Another embodiment of the present invention relates also to a clutch apparatus. The apparatus is a clutch apparatus for switching transmission and cutoff of a rotating force between a first rotating shaft and a second rotating shaft, and a first mode, a second mode and a third mode are switchable therebetween, where the first mode is a mode in which the rotating force is not transmitted between the first rotating shaft and the second rotating shaft, the second mode is a mode in which the rotation force is transmittable for a rotation in both directions while the first rotating shaft and the second rotating shaft are locked with each other, and the third mode is a mode in which a transmission of the rotating force is cancelable such that while the rotating force is transmittable, between the first rotating shaft and the second rotating shaft, for a rotation in one direction, the rotation of either the first rotating shaft or the second rotating shaft in the other direction is allowed.

In addition to the operation of the clutch apparatus that transmits and cuts off the rotation force, this embodiment can achieve the third mode in which the transmission of the rotating force is cancelable such that while the rotating force is transmittable, between the first rotating shaft and the second rotating shaft, for the rotation in one direction, the rotation of either the first rotating shaft or the second rotating shaft in the other direction is permitted. Thus, locking the two shafts with each other transmits the rotating force for the rotation in both directions, in the event that, for example, an abnormality occurs in the system where the clutch apparatus is used. Also, suppose that the rotation of one rotating shaft is to be assisted by using the rotating force acting on the other rotating shaft even though the system used in the clutch apparatus operates normally. Then, in this case, permitting the relative rotation, having an amount greater than or equal to a certain reference amount, enables the rotating force to be not only transmitted by using the rotation in one direction and but also cut off when rotated in the other direction. Thus, the use of the above-described clutch apparatus for a vehicle steering apparatus allows the two rotating shafts to be rotated relatively to each other in a situation where, for example, the assist control for the rotation is no longer required. As a result, the transmission of the rotating force is quickly cut off and therefore the steering feeling can be improved.

Still another embodiment of the present invention relates to a steering apparatus. The apparatus includes: an operating member rotated to steer a vehicle; a steering actuator that enables a steering-side reaction force to be generated by generating a rotating force transmitted to the operating member; a steering amount detector that detects information in response to a steering amount of the operating member; a turning mechanism that turns wheels, a turning actuator that enables the turning-side wheels to be turned by generating a rotating force transmitted to the turning mechanism, the above-described clutch apparatus, placed between the operating member and the turning mechanism, which switches transmission and cutoff of the rotating force between the operating member and the turning mechanism; and a control apparatus that not only performs control such that the steering-side reaction force is generated by the steering actuator in response to an input to the operating member, while the rotating force between the first rotating shaft and the second rotating shaft is being cut off by the clutch apparatus, but also controls a turning position on a turning side, based on information in response to a steering amount of the operating member. The control apparatus controls a switching such that the clutch apparatus is in the second engagement state, based on information, predicting that an output of the turning actuator required for a controlling of the turning position by the turning actuator will be deficient, or information indicating that the output thereof is actually deficient.

By employing this embodiment, the two rotating shafts can rotate relatively with each other in a situation where, for example, an assist to the rotating force to the turning mechanism is no longer required. Thus, the transmission of the rotating force can be quickly cut off and the steering feeling in the steering apparatus can be improved.

The steering apparatus may further include a turning amount detector that detects information in response to a turning amount of the turning mechanism. The control apparatus may perform control such that the clutch apparatus is switched to the second engagement state, based on at least one of the information in response to the steering amount and the information in response to the turning amount. This can promptly achieve the assist control to the turning mechanism using the rotating force produced by the steering actuator and an operation by the operating member.

Optional combinations of the aforementioned constituting elements, and implementations of the invention in the form of methods, apparatuses, systems, recording media, computer programs, and so forth may also be practiced as additional modes of the present invention.

Effect of the Invention

The present invention improves the steering feeling in a steering apparatus, for instance.

MODES FOR CARRYING OUT THE INVENTION

Figure 1:
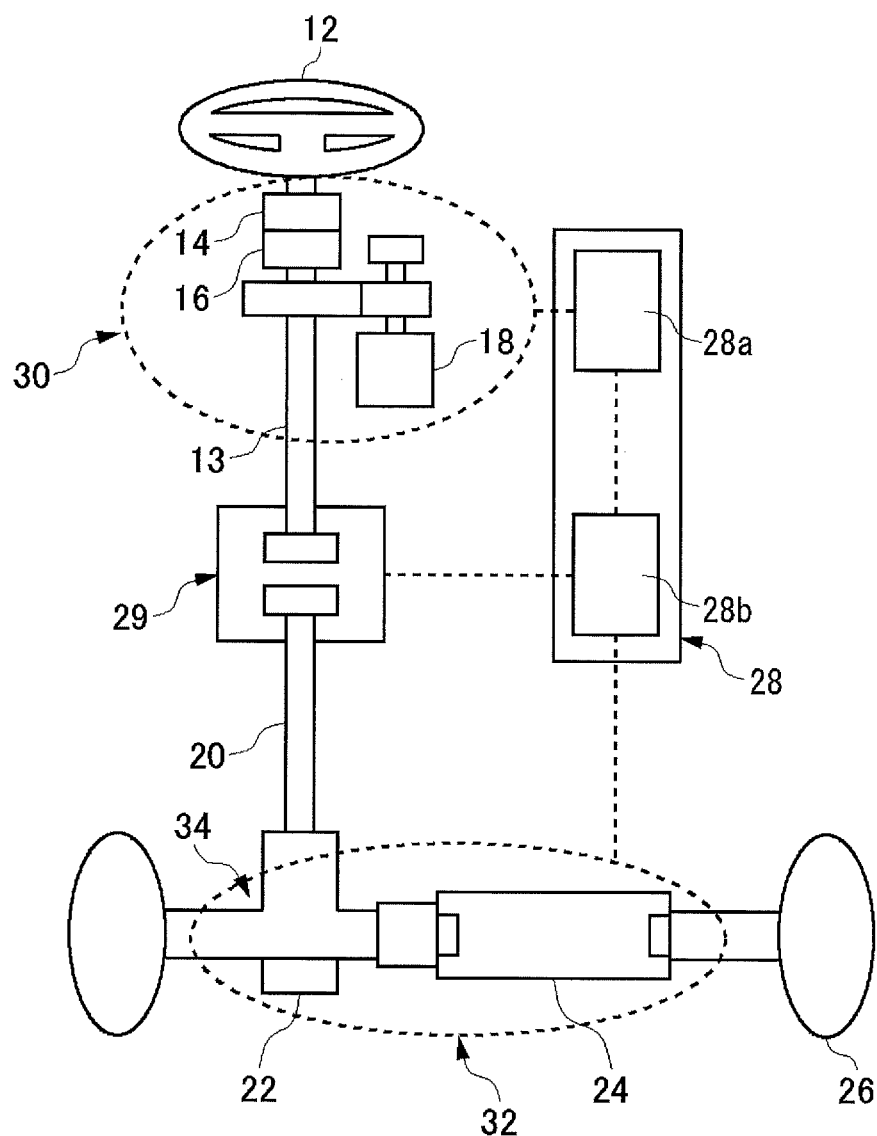
FIG. 1 schematically shows a structure of a vehicle steering control apparatus according to an embodiment.

A detailed description will be hereinafter given of embodiments by which to carry out the present invention, with reference to the accompanying drawings. The same or equivalent constituents in explaining the drawings will be denoted with the same reference numerals, and the repeated description thereof will be omitted as appropriate. A clutch apparatus (or simply called a "clutch") explained in the following embodiments is applicable to a steering apparatus for a vehicle. In particular, the clutch apparatus is suitable for a so-called steer-by-wire type steering apparatus for a vehicle. Here, the vehicle steering apparatus turns the wheels, according to operations of operating members, using a power generated by a power source provided in a turning unit under an electric control, but without using a steering force applied to the operating members, such as a steering wheel (handwheel) provided in the steering unit.

FIG. 1 schematically shows a structure of a vehicle steering control apparatus according to an embodiment. The vehicle steering apparatus 10 includes a steering wheel (handwheel) 12, a steering angle sensor 14, a torque sensor 16, a steering reaction force motor 18, an intermediate shaft 20, a turning angle sensor 22, a turning motor 24, tires 26, a control apparatus 28, and a clutch apparatus 29.

A steering actuator 30 is constituted by the steering angle sensor 14, the torque sensor 16, and the steering reaction force motor 18. A turning actuator 32 is constituted by the turning angle sensor 22 and the turning motor 24. The control apparatus 28 controls the steering reaction force motor 18 and the turning motor 24, based on information fed from various sensors included in the steering actuator 30 and the turning actuator 32.

More specifically, the control apparatus 28 has a steering ECU (electronic control unit) 28a and a turning ECU 28b. The steering ECU 28a controls the drive of the steering reaction force motor 18, based on information acquired from the steering angle sensor 14 and the torque sensor 16. The turning ECU 28b controls the drive of the turning motor 24, based on information acquired from the turning angle sensor 22 and the like. Also, the steering ECU 28a and the turning ECU 28b are configured such that they can communicate with each other when needed.

The steering wheel 12 is placed on a driver's seat side in a vehicle's passenger compartment, and functions as a steering member rotated in order for a driver to input and effect the steering amount. Also, a main shaft 13, to which an input received from the steering wheel 12 is transmitted, is coupled between the steering wheel 12 and the clutch apparatus 29.

The steering angle sensor 14 detects a rotation angle of the steering wheel 12, which represents the steering amount inputted by the driver, and then outputs this detected value to the steering ECU 28a. The steering angle sensor 14 functions as a detector for detecting the information in response to the steering amount of the steering wheel 12.

The torque sensor 16 detects a torque corresponding to the steering amount of the steering wheel 12. Based on the control performed by the steering ECU 28a, the steering reaction force motor 18 causes a reaction force to be operated on the steering wheel 12. Here, the reaction force is used to make driver feel and sense a steering reaction force according to the rotation angle of the steering wheel 12 detected by the steering angle sensor 14.

The steering ECU 28a and the turning ECU 28b are comprised of, for example, CPU, ROM, RAM and data buses connecting them with each other, and follow and run programs stored in ROM. Thus, the steering ECU 28a and the turning ECU 28b function as the control unit that performs control as follows. That is, the rotation angle of the steering wheel 12, which represents the steering amount inputted by the driver, is first detected. Then a turning amount based on the detected steering amount is calculated, thereby turning the tires 26, by controlling the turning motor 24, based on the calculated turning amount.

The turning motor 24 constitutes a part of the turning actuator 32, which operates on a rack bar in a vehicle width direction, based on the control performed by the turning ECU 28b. Here, the rack bar is coupled to the tire 26 via a tie rod, and extends in the width direction.

The turning angle sensor 22 detects a rotation angle of a pinion in a rack-and-pinion mechanism 34, which constitutes a part of the turning actuator 32, and then outputs this detected value to the control apparatus 28.

The intermediate shaft 20 plays a role of transmitting a steering force (rotating force) from the steering actuator 30 to the turning actuator 32, as a part of a backup mechanism in the event that the steer-by-wire system fails to function. The backup mechanism is comprised of the intermediate shaft 20, the clutch apparatus 29, the rack-and-pinion mechanism 34, and so forth.

The clutch apparatus 29 switches the transmission and cutoff of the rotating force between two rotating shafts. Though the structure of the clutch apparatus 29 will be described in detail later, during a normal operation of a system, the vehicle steering apparatus 10 functions as a steer-by-wire system; in this normal mode, the steering actuator 30 and the turning actuator 32 are disconnected and separated by the clutch apparatus 29. Suppose, on the other hand, that an abnormality occurs in the system and/or that the output of the turning motor 24 described later is deficient (namely, lower than what is minimally required). Then, the steering actuator 30 and the turning actuator 32 are mechanically coupled together by the clutch apparatus 29, so that the tires 26 can be directly turned by an operation of the steering wheel 12.

As described above, the vehicle steering apparatus 10 according to the present embodiment includes the steering wheel 12, which is rotated to steer the vehicle, the steering actuator 30 that enables a steering-side reaction force to be generated by generating the rotating force transmitted to the steering wheel 12, the steering angle sensor 14 for detecting the information in response to the steering amount of the steering wheel 12, the rack-and-pinion mechanism 34 that functions as the turning mechanism for turning the wheels, the turning actuator 32 that enables the turning-side wheels to be turned by generating the rotating force transmitted to the rack-and-pinion mechanism 34, the clutch apparatus 29, placed between the steering wheel 12 and the rack-and-pinion mechanism 34, which switches the transmission and cutoff of the rotating force between the steering wheel 12 and the rack-and-pinion mechanism 34, and the control apparatus 28. Here, while the rotating force between the main shaft 13 and the intermediate shaft 20 is being cut off by the clutch apparatus 29, the control apparatus 28 not only performs control such that a steering-side reaction force is generated by the steering actuator 30 in response to an input to the steering wheel 12 and but also controls the turning position on a turning side by the turning actuator 32, based on the information in response to the steering amount of the steering wheel 12. The control apparatus 28 controls the switching such that the clutch apparatus 29 is in a predetermined engagement state, based on information, predicting that the output of the turning actuator 32 required for the controlling of the turning position by the turning actuator 32 will be deficient, or information indicating that the output thereof is actually deficient.

Figure 2:
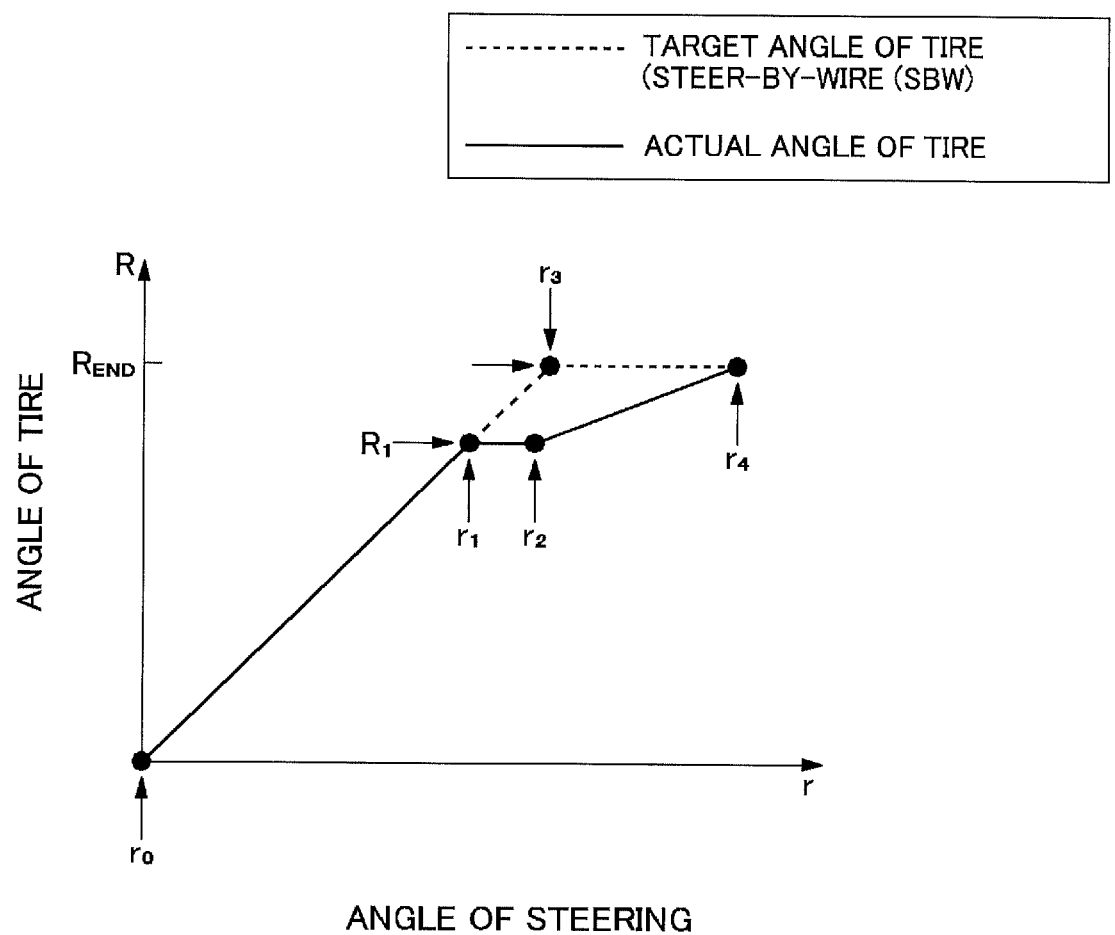
FIG. 2 is a graph schematically showing a relationship between a steering angle and a turning angle.

An operation of the vehicle steering apparatus 10 in controlling the turning position is now explained. FIG. 2 schematically shows a relationship between the steering angle and the turning angle. In a graph shown in FIG. 2, the horizontal axis indicates an angle of steering wheel (steering angle), which is an input side, and the vertical axis indicates an angle of tire (turning angle), which is an output side.

Consider a case of a normal steer-by-wire (SBW) control (hereinafter referred to as "SBW control" as appropriate). When, in this case, the angle r of steering wheel is in a neutral state $r_0$ ($r=r_0$), the clutch apparatus 29 works to cut off a rotating force transmitting path between the main shaft 13 and the intermediate shaft 20. In an ideal situation, the steering wheel 12 is rotated starting from a state where the angle r of steering wheel is equal to $r_0$, and an angle R of tire increases monotonically until the angle r of steering wheel is equal to $r_3$; when the angle R of tire reaches an end angle $R_{END}$, the angle R of tire no longer changes even though the steering wheel 12 is rotated further.

However, there are cases where, depending on a speed of the vehicle and/or a road surface condition, a target angle of tire (dotted line in FIG. 2) is not achieved responsive to the change in the angle of steering wheel. If, for example, the friction between the tires and the road surface is high and there exists an obstacle in a moving direction of tires, the output by the turning motor 24 is deficient and therefore lower than that required for the controlling of the target turning position during stationary steering while the vehicle is being stopped, for instance.

In the light of this, a description is given hereunder of a SWB control performed to cope with such a situation. The steering wheel 12 is rotated starting from a state where the angle r of steering wheel is equal to $r_0$, and the angle R of tire increases responsive to a change in the angle r of steering wheel until the angle r of steering wheel is equal to $r_1$. Since the mechanical coupling between the steering side and the turning side is being disabled by the clutch apparatus 29, the gear ratio of the angle r of steering wheel and the angle R of tire during this time period can be freely selected to a certain degree. During this time period, the tires 26 are turned by the drive power of the turning motor 24.

If, in a state where the angel R of tire is equal to $R_1$ (the angle r of steering wheel being equal to $r_1$), the output required for the controlling of the turning position (the angle of tire) by the turning motor 24 is deficient, the actual angle of tire (the solid line in FIG. 2) does not change, as shown in FIG. 2, even though the steering wheel 12 continues to rotate. In other words, the tires are not turned any further than this point. As a result, the target angle of tire (the dotted line shown in FIG. 2) corresponding to the angle of steering wheel deviates from the actual angle of tire and therefore the tires 26 will not be turned to the end angle $R_{END}$ even though the steering wheel 12 is rotated any further.

In the light of this, if the control apparatus 28 according to the present embodiment has acquired either the information, predicting that the output of the turning motor 24 required for the controlling of the turning position by the turning motor 24 will be deficient, or the information indicating that the output thereof is actually deficient, the control apparatus 28 will switch the states of the clutch apparatus 29 so that the rotating force exerted by an operation of the steering wheel 12 and the rotating force applied to the main shaft 13 by the steering reaction force motor 18 can be transmitted to the turning actuator 32 by way of the intermediate shaft 20 and consequently the rotating force transmitting path can be connected.

Here, the "information, predicting that the output of the turning motor 24 required for the controlling of the turning position by the turning motor 24 will be deficient" is information indicating, for example, a situation where a stationary steering (which is an action of sharply turning a steering wheel 12 at the time the vehicle is at a stop) is assumed. And the "information" corresponds to a case where, for example, a state where the vehicle is at a stop or running at an extremely low speed is detected by not-shown vehicle speed sensor and engine speed sensor and then the angle r of steering wheel, which is larger than a predetermined value, is detected by an output of the steering angle sensor 14. Also, the "information indicating that the output thereof required for the controlling of the turning position by the turning motor 24 is actually deficient" corresponds to a case where, for example, the angle R of tire detected by the turning angle sensor 22 deviates from the target angle of tire with respect to the angle r of steering wheel detected by the steering angle sensor 14, for instance.

In order to start an assist control for compensating for a deficiency of the turning force, the control apparatus 28, which has detected such information, switches the states of the clutch apparatus 29 for the purpose of connecting the rotating force transmitting path.

Figure 3:
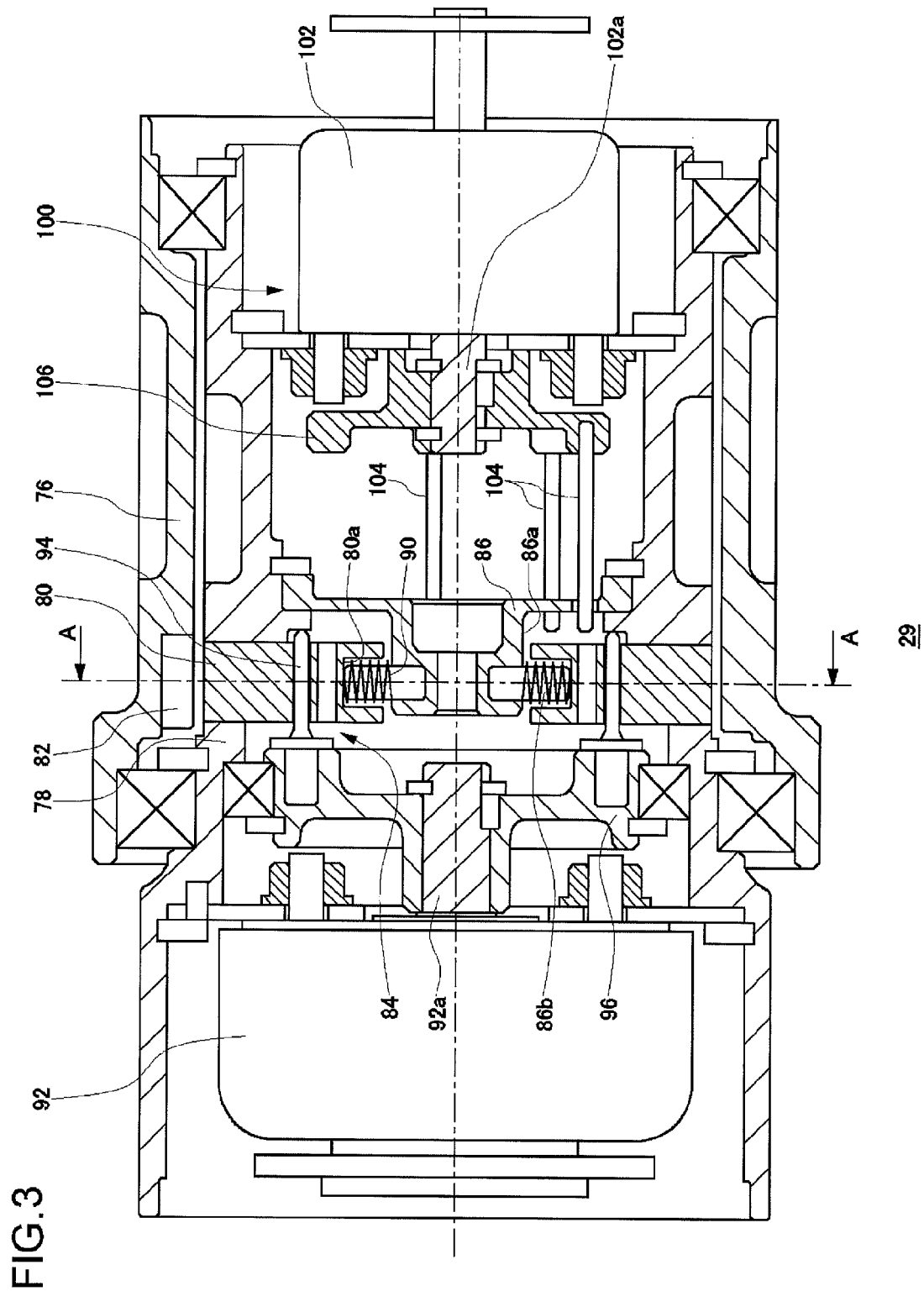
FIG. 3 is a cross-sectional view of a clutch apparatus in parallel with a shaft of the clutch apparatus according to an embodiment.
Figure 4:
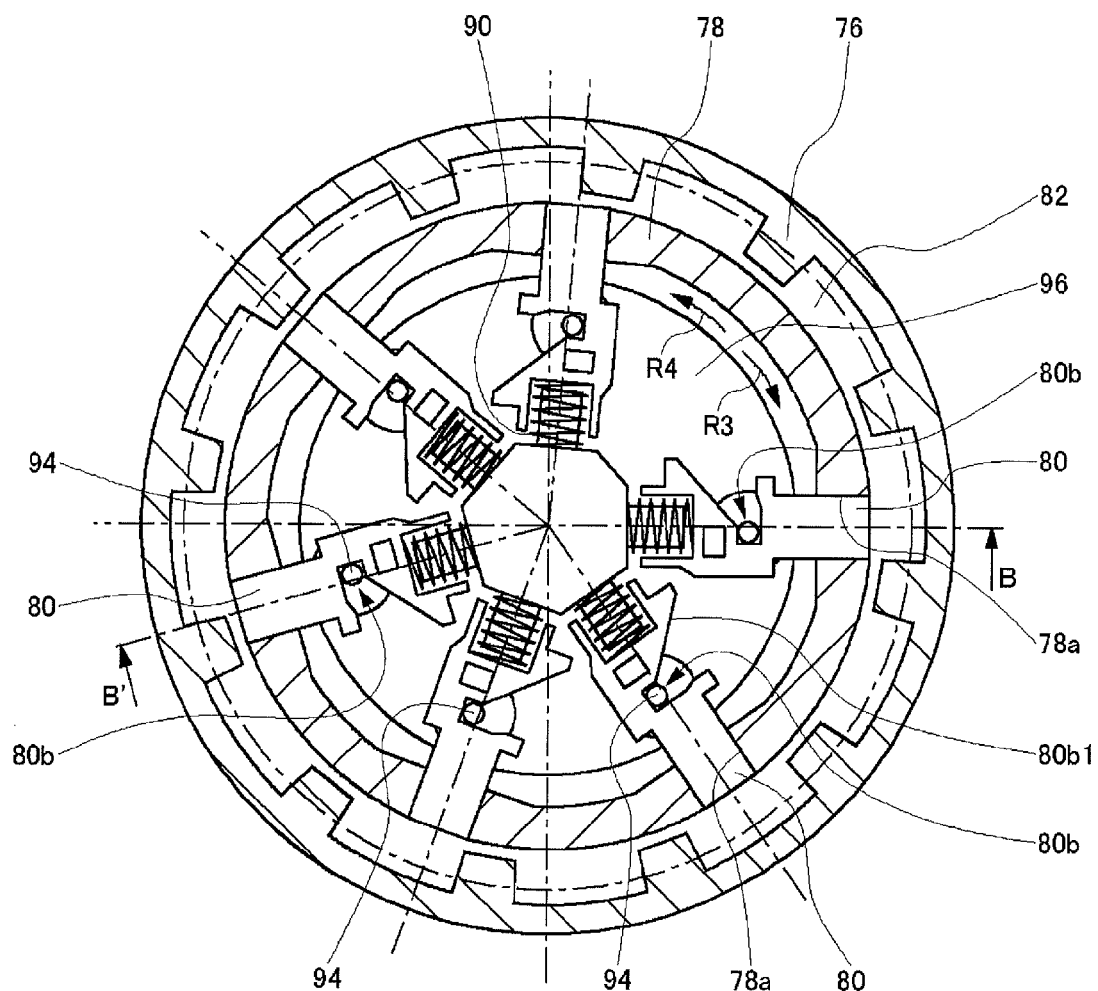
FIG. 4 is a cross-sectional view of the clutch apparatus taken along the line A-A of FIG. 3.

A detailed description is now given of a structure of the clutch apparatus 29. FIG. 3 is a cross-sectional view of the clutch apparatus 29 in parallel with a shaft of the clutch apparatus 29 according to the present embodiment. FIG. 4 is a cross-sectional view of the clutch apparatus 29 taken along the line A-A of FIG. 3. Note that FIG. 3 corresponds to a cross-sectional view taken along the line B-B' of FIG. 4.

The clutch apparatus 29 includes a ring-like steering-wheel-side housing 76, which is a first rotating shaft, a ring-like tire-side housing 78, which is a second rotating shaft, and a plurality of locking bars 80 functioning as engagement portions, which are so provided in the tire-side housing 78 as to be movable in a radial direction of the tire-side housing 78. The steering-wheel-side housing 76 is configured such that a plurality of lock grooves 82 are formed in a circumferential direction and also formed mutually at intervals in an inner circumference of the steering-wheel-side housing 76. The tire-side housing 78 is provided coaxially with the steering-wheel-side housing 76 and is arranged such that at least part of the tire-side housing 78 overlaps with the steering-wheel-side housing 76 as viewed laterally.

The steering-wheel-side housing 76 is coupled to the steering actuator 30 (see FIG. 1). Thus, the steering-wheel-side housing 76 is rotated in an interlocking manner with the rotation of the steering wheel 12. Also, the tire-side housing 78 is coupled to the turning actuator 32 (see FIG. 1) and is rotated interlocked with the rotation of the turning of the tire. The clutch apparatus 29 further includes an advancing/retreating mechanism 84 that advances and retreats the locking bars 80 toward and away from the lock grooves 82. The advancing/retreating mechanism 84 will be later described in detail.

In the clutch apparatus 29 according to the present embodiment, the six locking bars 80 are arranged radially. Each locking bar 80 is slidably supported along an opening 78a formed in a peripheral surface of the ring-like tire-side housing 78.

A spring support member 86 is fixed near an opening formed in a center of the tire-side housing 78 shown in FIG. 3. The spring support member 86 is configured such that a plurality of protrusions 86b are arranged radially on an outer periphery of a small-diameter part 86a corresponding to each locking bar 80. The protrusion 86b supports one end of a spring 90, which is a biasing member, so that the spring 90 will not be displaced or shifted. The other end of the spring 90 is also supported by a recess 80a formed in a position corresponding to the spring support member 86 of the locking bar 80. In FIG. 3 and FIG. 4, the springs 90 are being compressed.

The advancing/retreating mechanism 84 includes a rotary solenoid 92, which functions as an electrically-driven actuator, springs 90 that biases the locking bars 80 toward the lock grooves 82, pins 94, which control the advancing/retreating of the locking bars 80 by operating on the locking bars 80, a turntable 96 to which the pins 94 are secured.

The rotary solenoid 92 is configured such that when power is being supplied to the rotary solenoid 92 (i.e., the clutch apparatus being OFF), a shaft 92a rotates in an arrow R3 direction shown in FIG. 4 and such that when no power is supplied thereto (i.e., the clutch apparatus being ON), the shaft 92a rotates in an arrow R4 direction by a biasing force of a returning spring provided inside. FIG. 3 and FIG. 4 show a state where power is being supplied to the rotary solenoid 92.

The pin 94 is engaged with the locking bar 80 in a state where the pin 94 enters or moves into a notched groove 80b, which is formed from a central part of the locking bar 80 toward a lateral surface thereof. Also, the pin 94 abuts against the notched groove 80b with the clutch apparatus being OFF as shown in FIG. 3, and retreats from the notched groove 80b of the locking bar 80 with the clutch apparatus being ON described later.

The turntable 96 is secured to the shaft 92a of the rotary solenoid 92 and rotates clockwise or counterclockwise according to an electric conduction state of the rotary solenoid 92. In so doing, the pin 94 rotates clockwise or counter-clockwise together with the turntable 96 and changes its position.

An operation of the clutch apparatus is now described. As illustrated in FIG. 3 and FIG. 4, when the clutch apparatus 29 is in an OFF state, namely when the rotary solenoid 92 is electrically conducting, the locking bars 80 and the lock grooves 82 are not at all engaged with each other. Thus, the steering actuator 30 (see FIG. 1) and the turning actuator 32 (see FIG. 1) are cut off from each other and therefore no rotating force is transmitted therebetween.

More specifically, when power is supplied to the rotary solenoid 92, the turntable 96 rotates together with the shaft 92a of the rotary solenoid 92 in the arrow R3 direction, as illustrated in FIG. 4. At this time, the pin 94 moves into a back side (deep side) of the notched groove 80b while the pin 94 abuts against a lateral wall 80b1 of the notched groove 80b. Thereby, the locking bar 80 is gradually drawn inside the tire-side housing 78 and finally the locking bar 80 is regulated in a position where the clutch apparatus 29 is in an OFF state.

The clutch apparatus 29 according to the present embodiment includes a regulating mechanism 100. The regulating mechanism 100 is configured such that when a plurality of locking bars 80 are moved toward the lock grooves 82 by the above-described advancing/retreating mechanism 84, at last one locking bar 80 can be regulated.

The regulating mechanism 100 includes a pull-type solenoid 102, which functions as an electrically-driven actuator, at least one assist lock pin 104, which controls the advancing/retreating of the locking bars 80 by operating on the locking bars 80, and an adapter 106 to which the assist lock pins 104 are secured.

The pull-type solenoid 102 is configured such that when no power is supplied thereto (i.e., when the clutch apparatus functions as a bidirectional clutch connection), a shaft 102a is drawn by a biasing force of a returning spring provided inside. And the pull-type solenoid 102 is configured such that during an assist control period described later (i.e., when the clutch apparatus functions as a unidirectional clutch connection), the shaft 102a is protruded by supplying the power thereto. FIG. 3 shows a state where no power is supplied to the pull-type solenoid 102 (namely, the pull-type solenoid 102 is turned off).

Figure 5:
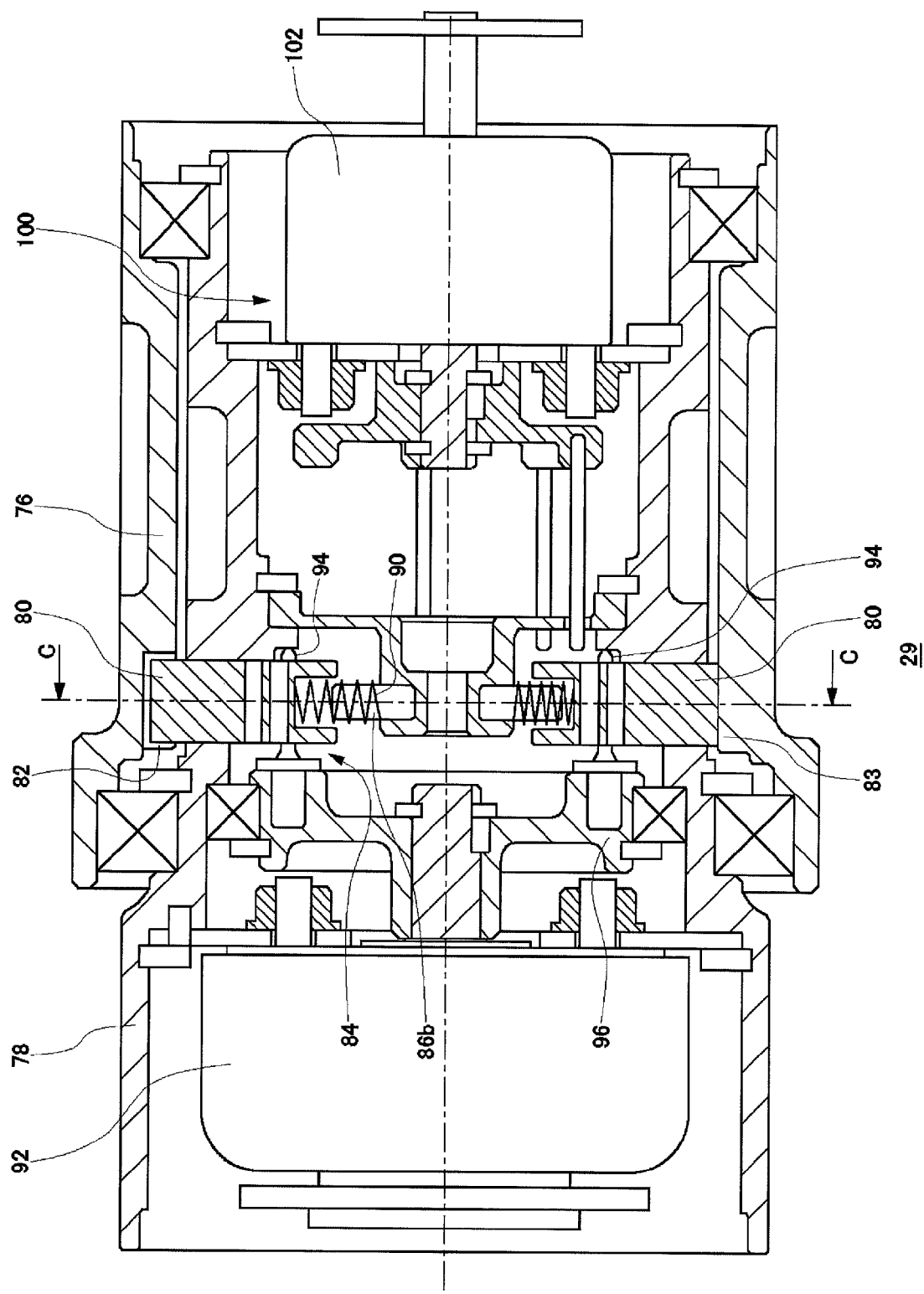
FIG. 5 is a cross-sectional view of a clutch apparatus (a clutch being in an ON state) in parallel with a shaft of the clutch apparatus according to an embodiment.
Figure 6:
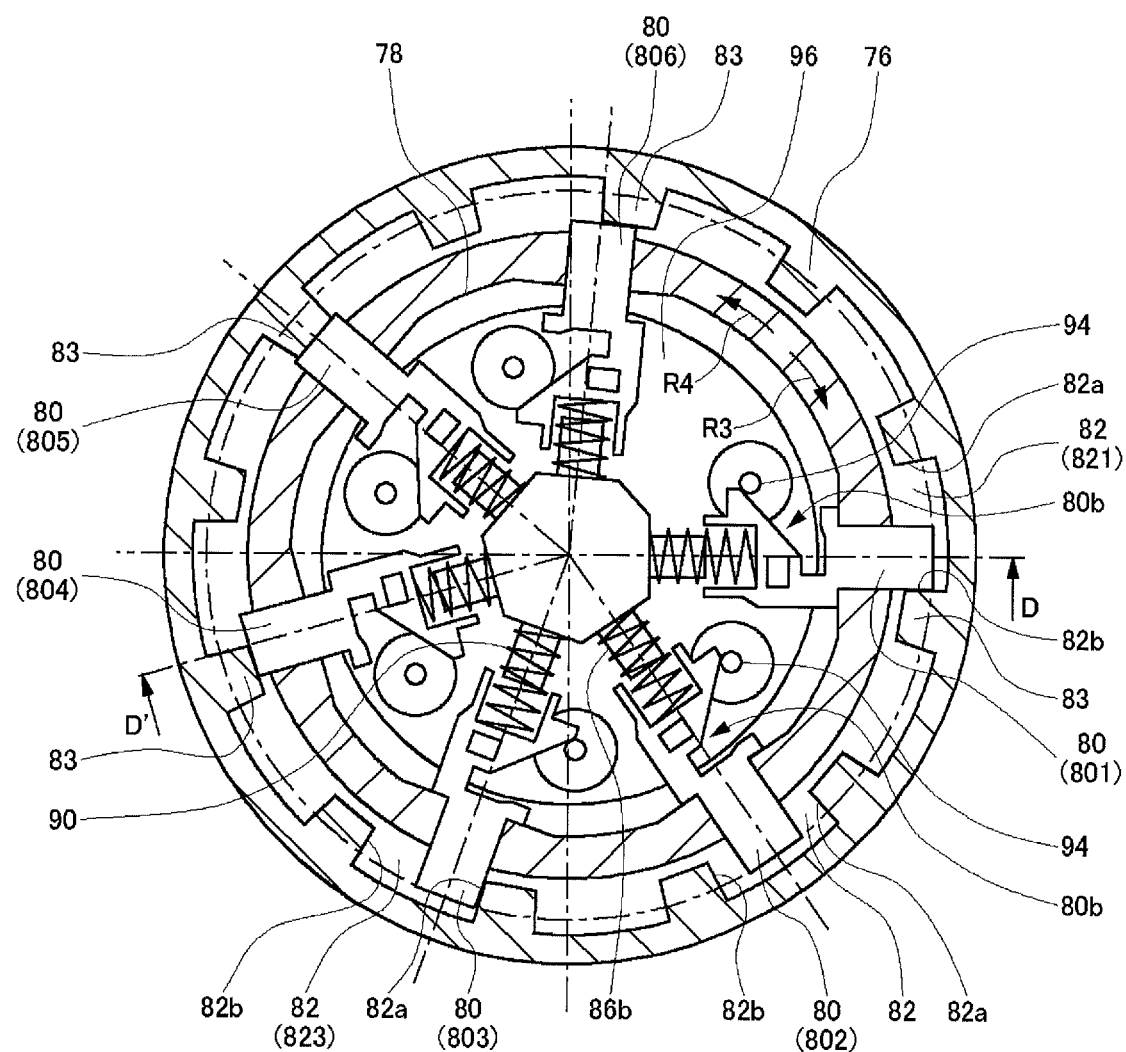
FIG. 6 is a cross-sectional view of the clutch apparatus taken along the line C-C of FIG. 5.

A description is now given of a case where the clutch apparatus is in an electrically nonconducting state (the clutch connection being effected (in an ON state) or "clutch connection ON state"). FIG. 5 is a cross-sectional view of the clutch apparatus 29 (a clutch being in an ON state or "clutch ON state") in parallel with a shaft of the clutch apparatus 29 according to the present embodiment. FIG. 6 is a cross-sectional view of the clutch apparatus 29 taken along the line C-C of FIG. 5. Note that FIG. 5 corresponds to a cross-sectional view taken along the line D-D' of FIG. 6.

When no power is supplied due to a system failure or the like, the clutch apparatus 29 operates as follows. That is, the biasing force of a returning spring of the rotary solenoid 92 enables the turntable 96, which has regulated the locking bars 80, to be rotated in an arrow R4 direction shown in FIG. 6. As a result, the position of the pin 94 inside the notched groove 80b of the locking bar 80 changes and thereby the pin 94 is retreated from the notched groove 80b. As a result, the locking bar 80, whose position has been regulated by the pin 94, can now move toward the lock groove 82 of the steering-wheel-side housing 76.

In this manner, the biasing force of the spring 90 causes a radially moving force, which moves in a radial direction of the tire-side housing 78 toward the lock groove 82 of the steering-wheel-side housing 76, to act on each locking bar 80. However, as shown in FIG. 6, the clutch apparatus 29 is configured such that not all of the locking bars 80 enter the lock groove 82.

In other words, a combination of the locking bars may vary in various manners, depending on the positional relationship between each locking bar 80 (hereinafter referred to as "locking bars 801 to 806" as appropriate, also) and each lock groove 82, namely the positional relationship between the steering-wheel-side housing 76 and the tire-side housing 78. In the clutch apparatus 29 shown in FIG. 6, the locking bars 801 to 803 enter the lock grooves 82, while the locking bars 804 to 806 abut against protrusions 83 provided between the lock grooves 82, instead of entering the lock grooves 82.

The state shown in FIG. 6 indicates a case where the clutch apparatus 29 is completely in a clutch ON state. However, the clutch apparatus 29 does not always reach this state upon disconnection of power to the rotary solenoid 92. A detailed description is further given hereinbelow of an operation where the clutch apparatus 29 comes to a complete "clutch-ON" state by a normal operation of the steering wheel 2.

Suppose, for example, that the steering-wheel-side housing 76 is in a position rotated slightly in the arrow R4 direction from the state of FIG. 6 (while the tire-side housing 78 remains in the state of FIG. 6). In this case, the locking bars 802 and 803 enter the lock grooves 82 but the locking bars 801, 804 to 806 abut against the protrusions 83 on an inner peripheral wall of the steering-wheel-side housing 76. Also, in this case, the locking bars 802 and 803, which have entered the lock grooves 82, both do not abut against lateral surfaces 82a and 82b. Thus, backlashes are created, in a rotation direction, between the steering-wheel-side housing 76 and the tire-side housing 78.

As the steering-wheel-side housing 76 is rotated in the arrow R3 direction from this state, the locking bar 801 enters the lock groove 82 and is engaged with the other lateral surface 82b of the lock groove 82 when the locking bar 803 abuts against one lateral surface 82a of the lock groove 82 and is engaged with it. As a result, as shown in FIG. 6, the backlashes, in the rotation direction, between the steering-wheel-side housing 76 and the tire-side housing 78 are almost no longer existent (in a locked state) by the locking bar 801, which enters a lock groove 821 and is engaged with the other lateral surface 82b, and the locking bar 803, which enters a lock groove 823 and is engaged with one lateral surface 82a. Thereby, the rotating force of the steering-wheel-side housing 76 can be reliably transmitted to the tire-side housing 78.

As described above, in the clutch apparatus 29 according to the present embodiment, the plurality of locking bars 80 have a first locking bar (the locking bar 803 in FIG. 6) and a second locking bar (the locking bar 801 in FIG. 6). More specifically, when the locking bars 80 move toward the plurality of lock grooves 82 by the advancing/retreating mechanism 84 including the rotary solenoid 92, the first locking bar 803 enters any one of the lock grooves (the lock groove 823 in FIG. 6), which is referred to as a "first lock groove" also, regardless of difference in rotational phase between the steering-wheel-side housing 76 and the tire-side housing 78. Also, when the first locking bar 803 moves in a counterclockwise direction (the arrow R4 direction shown in FIG. 6) with the first locking bar 803 being in a state of having entered a corresponding lock groove) and when the first locking bar 803 is engaged with a lateral surface (the lateral surface 82a in FIG. 6) of two lateral surfaces of a lock groove on one rotation direction (the arrow R4 direction) side, the second locking bar 801 enters a second lock groove (the lock groove 821 in FIG. 6), which differs from the first lock groove. The locking bar 801 shown in FIG. 6 is configured such that when the locking bar 801 enters the lock groove 821, the locking bar 801 is engaged with the lateral surface 82b, which is one of two lateral surfaces 82a and 82b of the lock groove 821, on the other rotation direction (the arrow R3 direction) side.

Thereby, the clutch apparatus 29 retreats each locking bar 80 from the lock groove 82 by the advancing/retreating mechanism 84, so that the vehicle steering apparatus 10 can be set to a separate state (disconnected state) where the rotating force is not transmitted in between the steering-wheel-side housing 76 and the tire-side housing 78. On the other hand, when the steering-wheel-side housing 76 is rotated in one rotation direction (e.g., in the arrow R3 direction) in a state (a locked state) where the steering-wheel-side housing 76 and the tire-side housing 78 are connected to each other by the advancing/retreating mechanism 84, the locking bar 803 is engaged with the lateral surface 82a, which is one of two lateral surfaces of the lock groove 823, on the other rotation direction (the arrow R4 direction) side. Thus, the rotating force can be transmitted to the tire-side housing 78 with almost no backlash. Also, when the steering-wheel-side housing 76 is rotated in the other rotation direction (e.g., in the arrow R4 direction), the locking bar 801 is engaged with the lateral surface 82b, which is one of two lateral surfaces of the lock groove 821, on one rotation direction (the arrow R3 direction) side. Thus, in the clutch apparatus 29, the rotating force can be transmitted to the tire-side housing 78 with almost no backlash.

Also, the clutch apparatus 29 is configured such that the locking bar 80 is retreated from the lock groove 82 by a force, which is larger than a biasing force of the spring 90 and which results from a movement caused when power is supplied to the rotary solenoid 92, and such that when no power is supplied to the rotary solenoid 92, the locking bar 802 and the locking bar 803 enter the lock grooves 82 by the biasing force of the springs 90. Thereby, at a time of emergency when the power to the rotary solenoid 92 is disconnected, the locking bar 802 and the locking bar 803 enter the lock grooves 82, so that the steering-wheel-side housing 76 and the tire-side housing 78 can be promptly connected together.

Also, the clutch apparatus 29 advances and retreats the locking bars 80 by converting the rotary motion of the rotary solenoid 92. Thus, the length of the clutch apparatus in a shaft direction can be suppressed.

Figure 7:
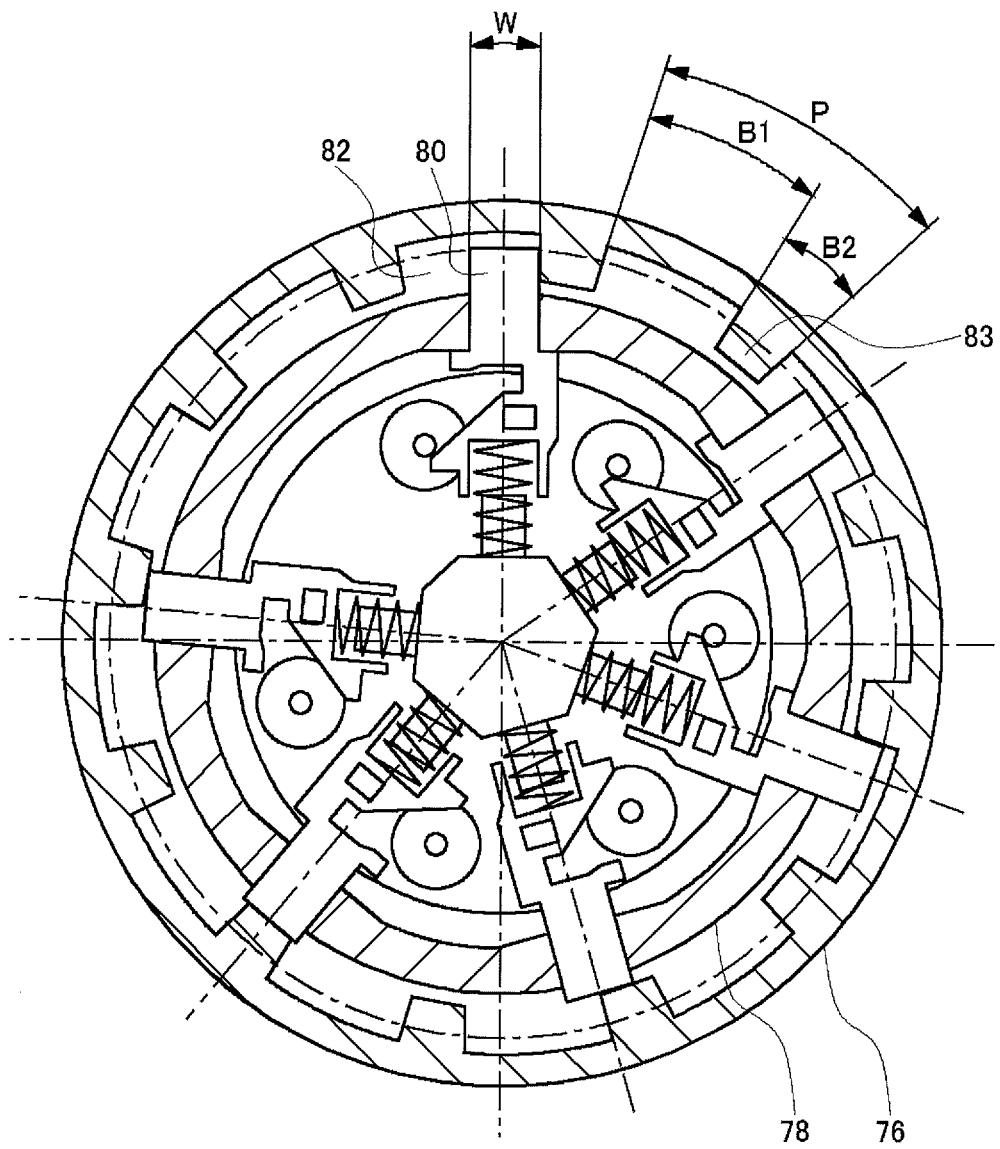
FIG. 7 is a diagram for explaining the shapes of a locking bar and a lock groove.
Figure 8:
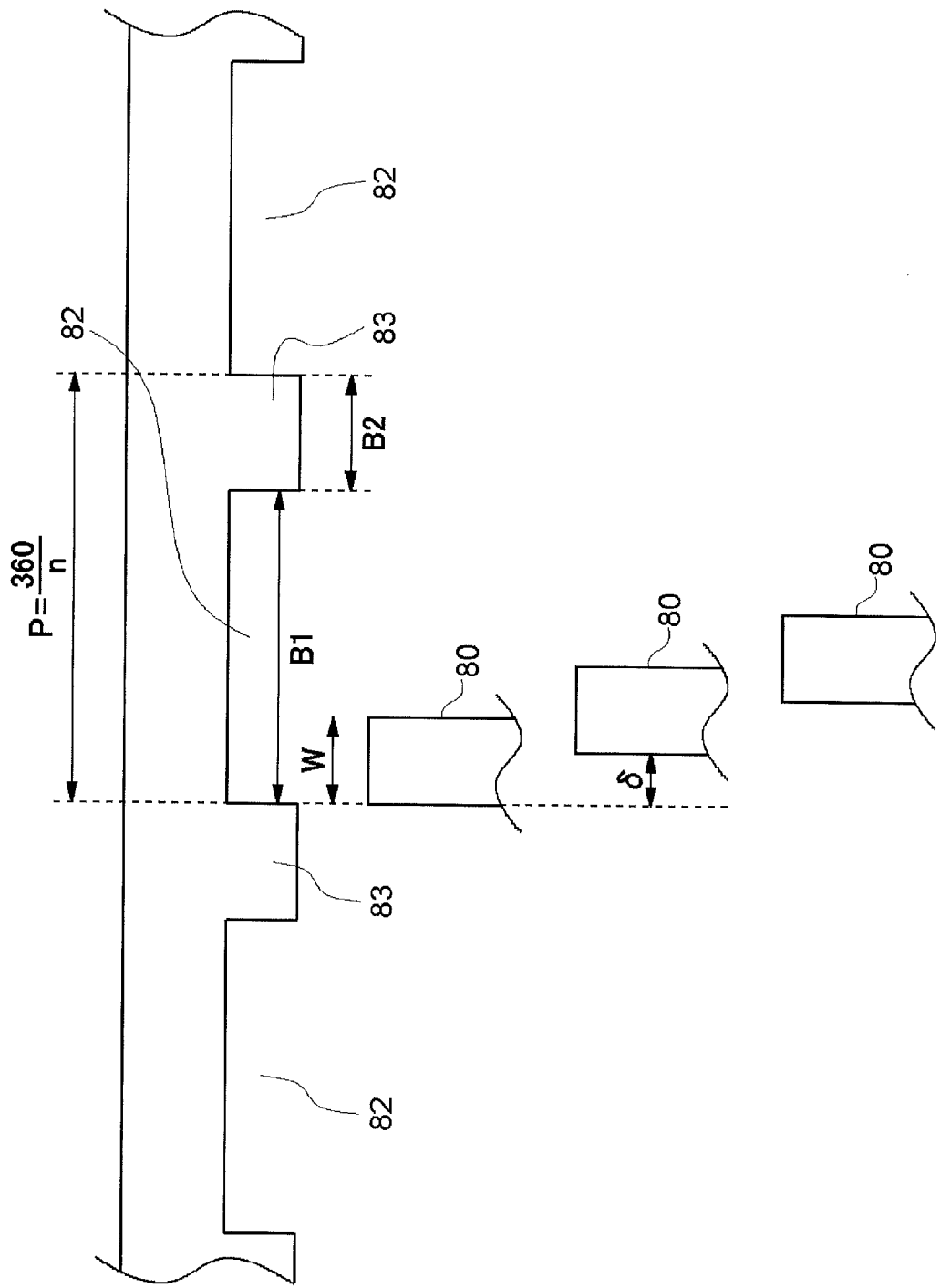
FIG. 8 is a schematic diagram linearly showing a relationship, between the locking bar and the lock groove, shown in FIG. 7.

A description is now given of a preferable relationship between the locking bars 80 and the lock grooves 82. FIG. 7 is a diagram for explain the shapes of the locking bar 80 and the lock groove 82. FIG. 8 is a schematic diagram linearly showing a relationship, between the locking bars and the lock grooves, shown in FIG. 7.

As illustrated in FIG. 7 and FIG. 8, suppose that the number of lock grooves 82 (the plurality n of the lock grooves 82) is denoted by n [pieces], the pitch of the lock grooves 82 is denoted by P, the number of locking bars 80 (the plurality N of the locking bars 80) is denoted by N [pieces], the number of locking bars 80 entering a plurality of lock grooves 82 is denoted by Nx [pieces], the width of the locking bar 80 is denoted by W [deg], the width of the lock groove 82 is denoted by B1 [deg], the distance between the lock groove 82 and a lock groove 82 adjacent thereto (the width of the protrusion 83) is denoted by B2 [deg], the shifted or deviated angle formed when the locking bar 80 is engaged into the lock groove 82 is denoted by δ [deg]. Then, each parameter in the clutch apparatus 29 according to the present embodiment is so set to satisfy the following Equations (1) to (3).

$$P = 360/n \quad \text{Equation (1)}$$

$$B1 \approx W + (\delta \times (Nx - 1)) \quad \text{Equation (2)}$$

$$\delta = P/N \quad \text{Equation (3)}$$

Note here that the values of each Equation allow some errors due to a design freedom and component tolerances.

Thereby, at least one locking bar 80 is always in a position where it can enter a lock groove 82, regardless of a relative phase between the steering-wheel-side housing 76 and the tire-side housing 78. Also, the design can be made such that the shifted angle δ, which may be formed when the steering-wheel-side housing 76 and the tire-side housing 78 are connected (a locked state), is taken into consideration. Here, the shifted angle δ formed at the time of connection is a parameter indicating an angle at which the clutch ON state (locked state) is achieved in the clutch apparatus 29 when one of the steering-wheel-side housing 76 and the tire-side housing 78 is rotated relative to the other thereof, by the shifted angle δ formed at the time of connection, regardless of a relative phase between the steering-wheel-side housing 76 and the tire-side housing 78. In other words, setting the shifted angle δ smaller allows the steering actuator 30 and the turning actuator 32 to be mechanically coupled together with a slight amount of operation (movement) of the steering wheel in the event of occurrence of an abnormality in the system. This helps to improve the responsiveness in a fail-safe mechanism in the vehicle steering apparatus 10.

As described earlier, the vehicle steering apparatus 10 includes the steering wheel 12, which is rotated to steer the vehicle, the steering angle sensor 14 for detecting the information in response to the steering amount of the steering wheel 12, the rack-and-pinion mechanism 34 for turning the tires 26, the turning motor 24 for driving the rack-and-pinion mechanism 34, the clutch apparatus 29, placed between the steering wheel 12 and the rack-and-pinion mechanism 34, which switches the transmission and cutoff of the rotating force between the steering wheel 12 and the rack-and-pinion mechanism 34, and the control apparatus 28, which drives the turning motor 24 and controls the turning amount based on the information in response to the steering amount, in a state where the rotating force has been cut off by the clutch apparatus 29. The steering wheel 12 is coupled to the steering-wheel-side housing 76. The rack-and-pinion mechanism 34 is coupled to the tire-side housing 78. In the clutch apparatus 29, the steering-wheel-side housing 76 and the tire-side housing 78 are mechanically coupled to each other such that the turning angel of the wheels can change in response to an operation of the steering wheel, while the rotating force between the steering wheel 12 and the rack-and-pinion mechanism 34 is transmittable.

Thereby, while the rotating force is being cut off by the clutch apparatus 29, the turning motor 24 is driven. And when the turning amount is controlled based on the information in response to the steering amount of the steering wheel 12, the torque variation and the like are not transmitted to the steering wheel 12 from the rack-and-pinion mechanism 34. This can improve the steering feeling.

Now, refer back to the description of SBW control shown in FIG. 2. The control apparatus 28 switches the state to a connection state where an assist control can be performed on the clutch apparatus 29, within a range $(r_1 < r < r_2)$ where the angle of tire remains unchanged against the change of the angle r of steering wheel.

Figure 9:
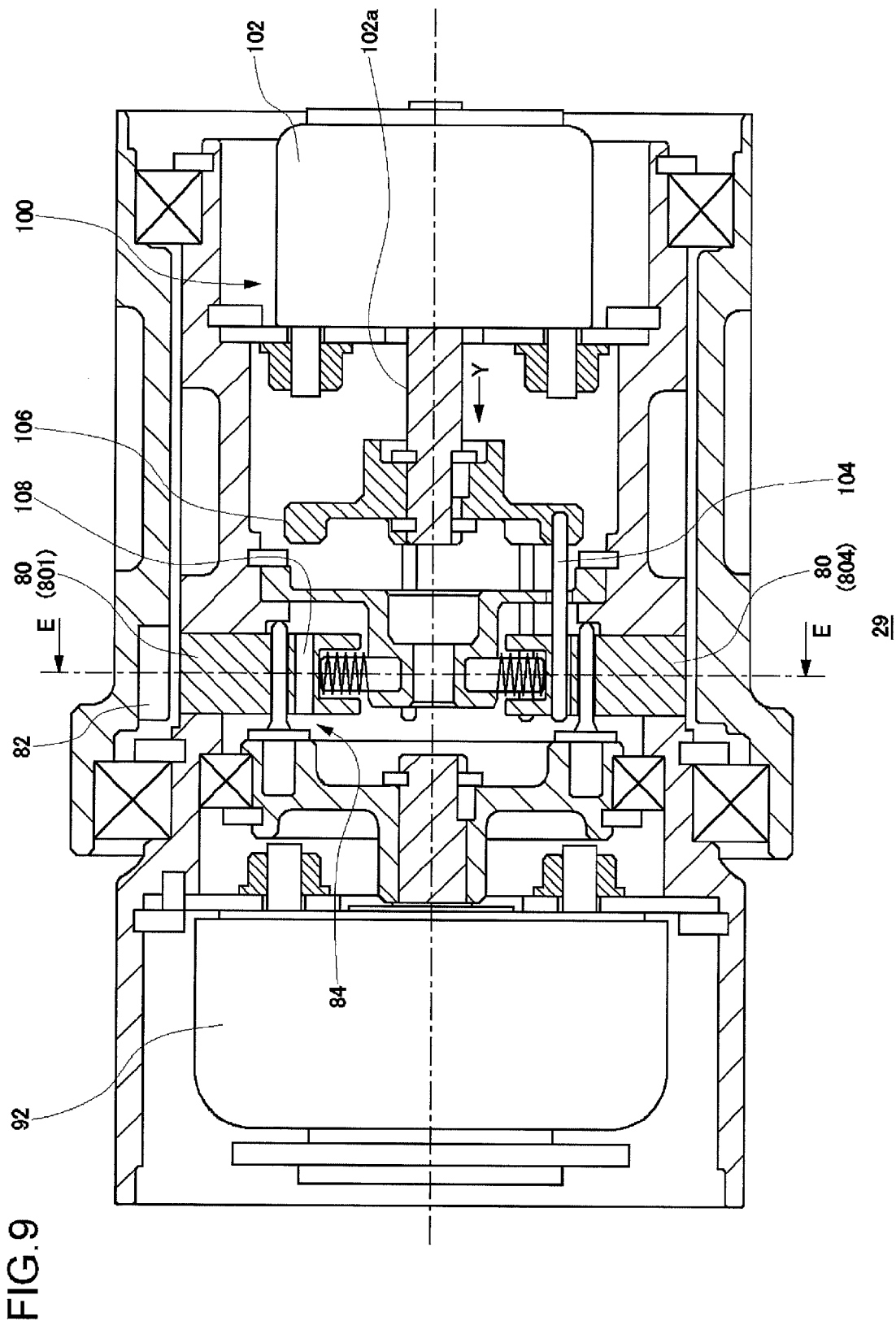
FIG. 9 is a cross-sectional view of a clutch apparatus (pre-assist-control state) in parallel with a shaft of the clutch apparatus according to an embodiment.
Figure 10:
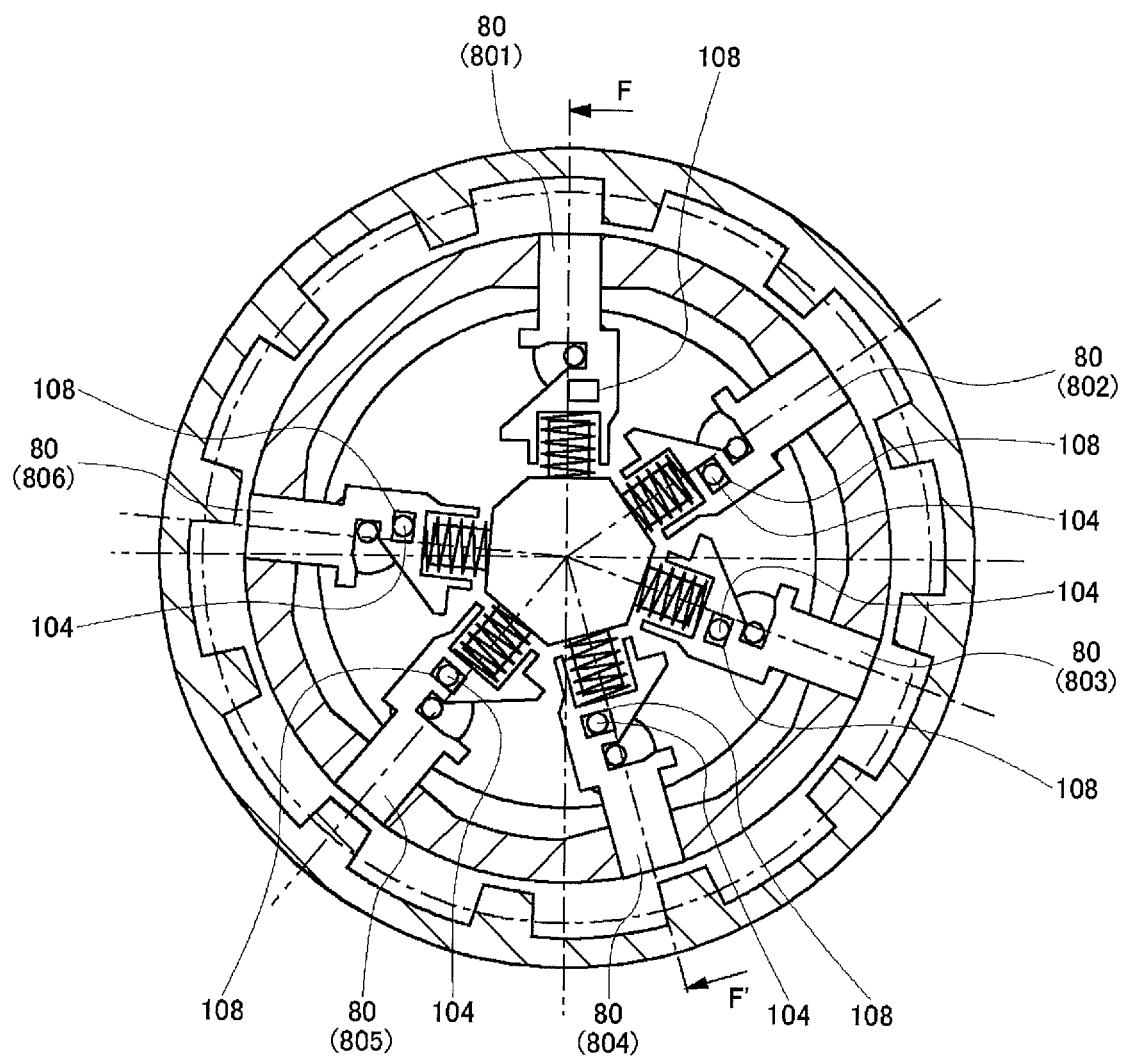
FIG. 10 is a cross-sectional view of the clutch apparatus taken along the line E-E of FIG. 9.

A description is now given of a preparation process where the clutch apparatus is switched to a unidirectional clutch connection state. FIG. 9 is a cross-sectional view of the clutch apparatus 29 (pre-assist-control state) in parallel with a shaft of the clutch apparatus 29 according to the present embodiment. FIG. 10 is a cross-sectional view of the clutch apparatus 29 taken along the line E-E of FIG. 9. Note that FIG. 9 corresponds to a cross-sectional view taken along the line F-F' of FIG. 10.

In a state where the clutch connection is not in effect (as shown in FIG. 3 and FIG. 4) as in the SBW control, namely, in the state where the locking bars 80 are not entered into any of the lock groove 82 by using the advancing/retreating mechanism 84, power is supplied to the pull-type solenoid 102 in the regulating mechanism 100 if the control apparatus 28 is to perform the assist control. As illustrated in FIG. 9 and FIG. 10, assist lock grooves 108, into which the assist lock pins 104 can enter, are formed in each locking bar 80. Accordingly, the movement of the shaft 102a of the pull-type solenoid 102 in an arrow Y direction enables at least one assist lock pin 104 to enter the assist lock groove 108 and then enables it to be engaged with the locking bar 80.

The regulating mechanism 100 according to the present embodiment includes five assist lock pins 104, which are engaged with five locking bars 802 to 806 excluding the locking bar 801. Thus, the positions of the five locking bars 802 to 806 excluding the locking bar 801 are regulated at their positions indicated in FIG. 10. While, on the other hand, the locking bar 801 is retreated from the lock groove 82 by the advancing/retreating mechanism 84, the position of the locking bar 801 will not be regulated by the regulating mechanism 100.

Figure 11:
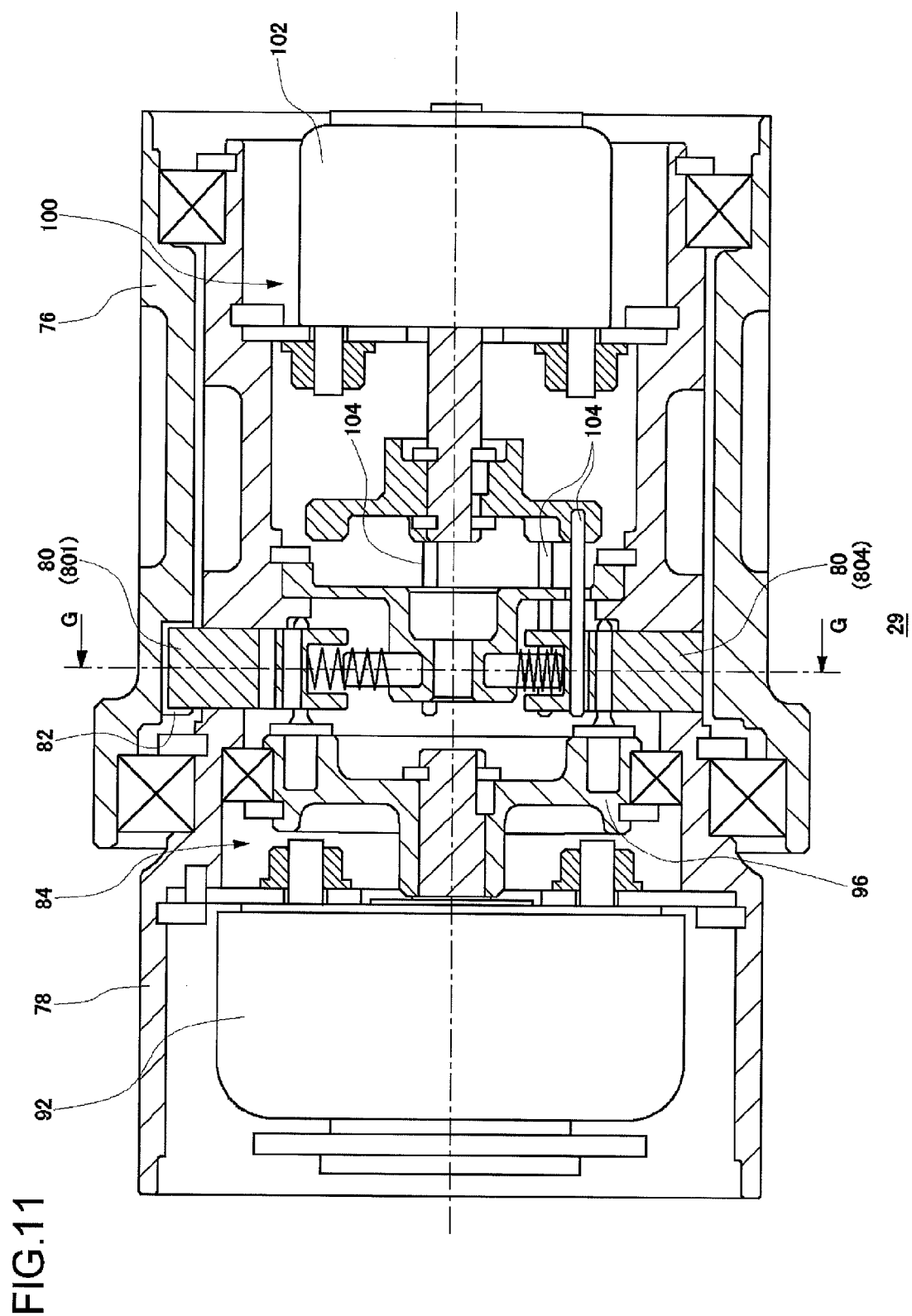
FIG. 11 is a cross-sectional view of a clutch apparatus (assist-control state) in parallel with a shaft of the clutch apparatus according to an embodiment.
Figure 12:
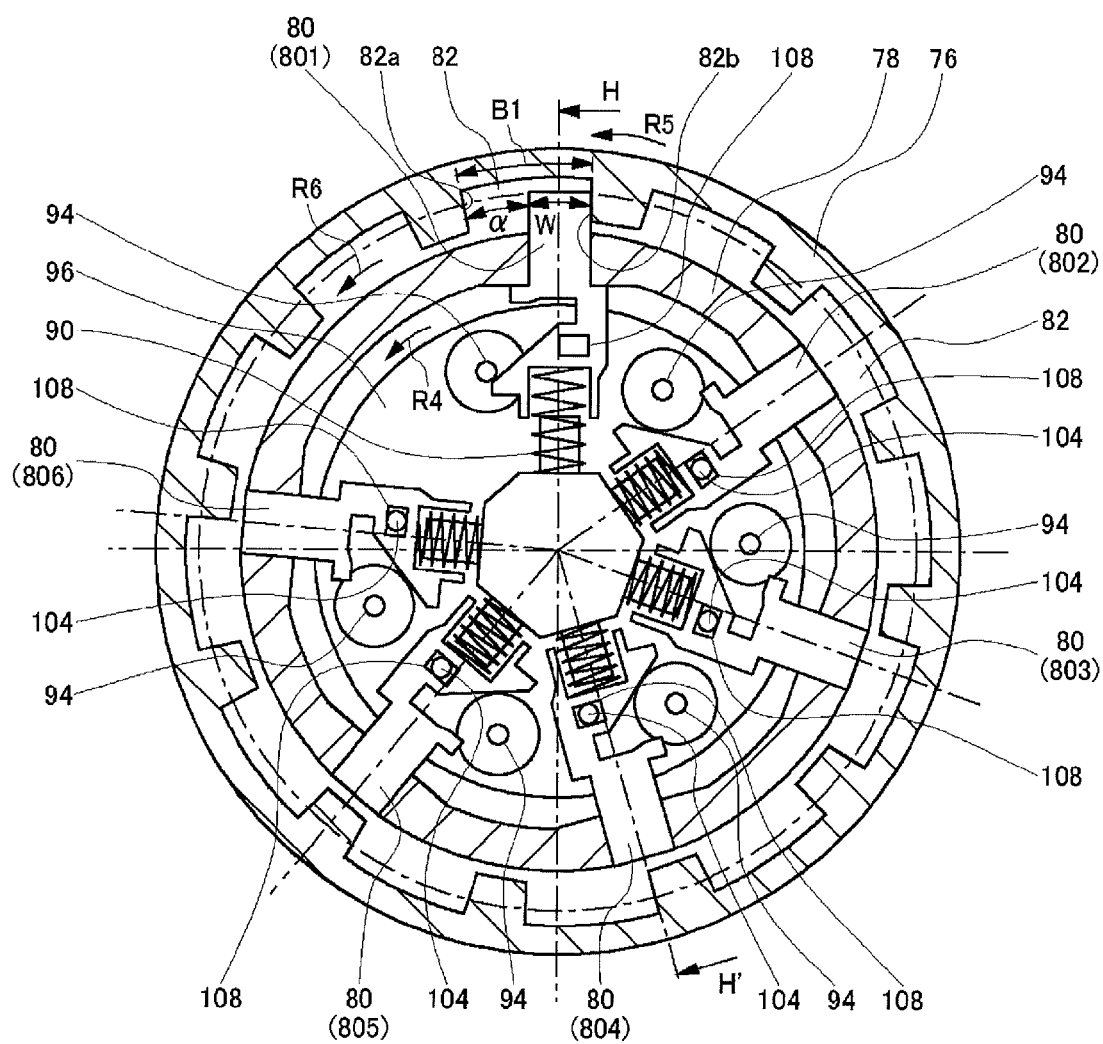
FIG. 12 is a cross-sectional view of the clutch apparatus taken along the line G-G of FIG. 11.

A description is now given of the unidirectional clutch connection state of the clutch apparatus. FIG. 11 is a cross-sectional view of the clutch apparatus 29 (assist-control state) in parallel with a shaft of the clutch apparatus 29 according to the present embodiment. FIG. 12 is a cross-sectional view of the clutch apparatus 29 taken along the line G-G of FIG. 11. Note that FIG. 11 corresponds to a cross-sectional view taken along the line H-H' of FIG. 12.

The control apparatus 28 turns off the rotary solenoid 92 of the advancing/retreating mechanism 84 in the state shown in FIG. 10. Thereby, the turntable 96, which has regulated the locking bars 80, are rotated in an arrow R4 direction indicated in FIG. 12 by the biasing force of the returning spring of the rotary solenoid 92. As a result, the position of the pin 94 inside the notched groove 80b of each of the locking bars 801 to 806 changes and thereby the pin 94 is retreated from the notched groove 80b. However, the assist lock pins 104 are engaged into the assist lock grooves 108 in the locking bars 802 to 806, respectively; thus the positions of the locking bars 802 to 806 are regulated so that the locking bars 802 to 806 cannot move toward the lock grooves 82 of the steering-wheel-side housing 76. On the other hand, the assist lock pin 104 is not engaged into the assist lock groove 108 in the locking bar 801 and therefore the locking bar 801 can move toward the lock groove 82 of the steering-wheel-side housing 76.

In this manner, the biasing force of the spring 90 causes a radially moving force, which moves in a radial direction of the tire-side housing 78 toward the lock groove 82 of the steering-wheel-side housing 76, to exert on the locking bar 801. Thereby, the clutch apparatus 29 can be instantly switched to the unidirectional clutch connection state, when the output of the turning motor 24 is deficient.

As illustrated in FIG. 12, when the clutch apparatus 29 is switched to the connection state, the locking bar 801 enters the lock groove 82. As, in this state, the steering wheel 12 is further rotated and thereby the steering-wheel-side housing 76 is rotated in an arrow R5 direction, the locking bar 801 abuts against the other lateral surface 82b of the lock groove 82 and is engaged therewith (the angle r of steering wheel being equal to $r_2$: see FIG. 2). Note here that the width W [deg] of the locking bar 801 is smaller than the width B1 [deg] of the lock groove 82. Thus, the clutch apparatus 29 is configured such that a predetermined amount of relative rotation α, which is equal to (B1−W), between the steering-wheel-side housing 76 and the tire-side housing 78, is permitted in a state where locking bars 80 can be engaged into the lock grooves 82. In other words, the locking bar 80 is of such a shape that the rotation in at least one direction is permitted in the tire-side housing 78 while the locking bar 80 has entered the lock groove 82. Here, the relative rotation α is designed such that the value thereof is larger than a relative rotation (backlash) permitted during the clutch connection ON state shown in FIG. 6.

As the steering wheel 12 is rotated further than the angle r of steering wheel being $r_2$, the rotating force is transmitted in the arrow R5 direction from the steering-wheel-side housing 76 to the tire-side housing 78, by way of the locking bar 80. At this time, the steering ECU 28a controls the steering reaction force motor 18 such that the steering reaction force motor 18 applies the rotation force, whose rotation direction is the same as that of the steering wheel 12, to the main shaft 13. Then, the assist control is performed in the range of $r_2$ to $r_4$ for the angle r of steering wheel (in the range of $R_1$ to $R_{END}$ for the angle R of tire).

Thereby, the steering reaction force motor 18 can supplement the output, in a predicted situation where the output of the turning motor 24 required for the controlling of the turning position by the turning motor 24 will be deficient, in a situation where the output thereof is actually deficient, and in the like situation.

Suppose that the output of the turning motor 24 required for the controlling of the turning position by the turning motor 24 has sharply dropped in a state where the steering reaction force motor 18 supplements the output of the turning motor 24 required for the controlling of the turning position by the turning motor 24. Then, the angle of tire may possibly vary abruptly. More specifically, in this case, the turning-side rotating shaft may possibly turn sharply and simultaneously the steering-side rotating shaft, which has been connected to the turning-side rotating shaft, may possibly be affected and rotated, too. In particular, if the turning-side rotating shaft and the steering-side rotating shaft are connected in a completely locked state via the clutch apparatus, the rotation of the turning-side rotating shaft will be transmitted to the steering wheel through the steering-side rotating shaft. This may possibly bring about the so-called self-steer state where the steering wheel is rotated against the driver's intention.

However, even though, in the vehicle steering apparatus 10 according to the present embodiment, the rotating force transmitting path between the main shaft 13 and the intermediate shaft 20 are being connected by using the clutch apparatus 29, a predetermined amount of relative rotation in between the main shaft 13 (the steering-wheel-side housing 76) and the intermediate shaft 20 (the tire-side housing 78) is permitted as shown in FIG. 12. For this reason, if the tire-side housing 78 shown in FIG. 12 rotates relative to the steering-wheel-side housing 76 in an arrow R6 direction, the locking bar 80 will get separated away from the lateral surface of the lock groove 82, so that the steering-wheel-side housing 76 can be spaced away from the tire-side housing 78. In other words, the engagement state of the steering-wheel-side housing 76 and the tire-side housing 78 is released with the result that the rotation fore is no longer transmitted therebetween. This suppresses or prevents the occurring of a situation where, for example, the rotating force applied to the tire-side housing 78 is transmitted to the steering-wheel-side housing 76 so as to rotate the main shaft 13 and the steering wheel 12.

The following operations and advantageous effects may be performed and achieved by the above-described clutch apparatus 29 and the vehicle steering apparatus 10 equipped with such the clutch apparatus 29.

The clutch apparatus 29 according to the present embodiment achieves a first engagement state (a bidirectional clutch connection state shown in FIG. 6) and a second engagement state (a unidirectional clutch connection state). In the first engagement state, the two rotating shafts, which are the steering-wheel-side housing 76 and the tire-side housing 78, are locked with each other, with a backlash, which is less than or equal to a first predetermined amount, so that the rotation force can be transmitted for the rotation in both directions. In the second engagement state, a relative rotation α having a second predetermined amount, which is greater than the first predetermined amount, is allowed between the two rotating shafts.

Thus, locking the two shafts with each other transmits the rotating force for the rotation in both directions, in the event that an abnormality occurs in the system where the clutch apparatus 29 is used (e.g., when a failure occurs in the steering apparatus and/or a vehicle's power supply). Also, suppose that the rotation of one rotating shaft (the tire-side housing 78) is to be assisted by using the rotating force acting on the other rotating shaft (the steering-wheel-side housing 76) even though the system used in the clutch apparatus operates normally. Then, in this case, permitting the relative rotation α having the second predetermined amount larger than the first predetermined amount enables the rotating force to be not only transmitted by using the rotation in one direction and but also cut off when rotated in the other direction. In this manner, the use of the above-described clutch apparatus 29 for the vehicle steering apparatus 10 allows the two rotating shafts to be rotated relatively to each other in a situation where, for example, the assist control for the rotation is no longer required. As a result, the transmission of the rotating force is quickly cut off and therefore the steering feeling can be improved.

Here, the first predetermined amount may be set in consideration of the component tolerances and the precision required for the mechanical connection of components, for instance. Or the first predetermined amount may be set in consideration of a backlash permitted in terms of the operability of a system (e.g., a steering apparatus) where a clutch apparatus is used, and so forth. The first predetermined amount in the present embodiment may be thought of as a backlash in the steering wheel operation during a bidirectional (complete) clutch connection state shown in FIG. 6. Also, the second predetermined amount according to the present embodiment, which is a value larger than the first predetermined amount, may be an approximately set value, by which a first state of the two rotating shafts being connected and a second state thereof being not connected can be clearly distinguished between the first and second states. In other words, the second predetermined amount is not a value having the magnitude of a backlash or looseness between the components but may be suitably expressed as a value set for the purpose of realizing an intended operation (the aforementioned unidirectional clutch connection).

The clutch apparatus 29 may be also defined and summarized in a generic manner as follows. The clutch apparatus 29 is a clutch apparatus for switching the transmission and cutoff of the rotating force between the steering-wheel-side housing 76 and the tire-side housing 78, and is configured such that a first mode, a second mode and a third mode are switchable therebetween. Here, the first mode is a mode (a clutch connection OFF state) in which the rotating force is not transmitted between the steering-wheel-side housing 76 and the tire-side housing 78. The second mode is a mode (the bidirectional clutch connection state) in which the rotation force is transmittable for the rotation in both directions while the steering-wheel-side housing 76 and the tire-side housing 78 are locked with each other. The third mode is a mode (the unidirectional clutch connection state) in which the transmission of the rotating force is cancelable such that while the rotating force is transmittable, between the steering-wheel-side housing 76 and the tire-side housing 78, for the rotation in one direction, the rotation of either the steering-wheel-side housing 76 or the tire-side housing 78 in the other direction is permitted.

Thereby, in addition to the basic operation of the clutch apparatus 29 that transmits and cuts off the rotation force, the third mode can be achieved where the transmission of the rotating force is cancelable such that while the rotating force is transmittable, between the steering-wheel-side housing 76 and the tire-side housing 78, for the rotation in one direction, the rotation of either the steering-wheel-side housing 76 or the tire-side housing 78 in the other direction is permitted (the unidirectional clutch connection state). Thus, locking the steering-wheel-side housing 76 and the tire-side housing 78 with each other transmits the rotating force for the rotation in both directions, in the event that, for example, an abnormality occurs in the system where the clutch apparatus 29 is used. Also, suppose that the rotation of the tire-side housing 78 is to be assisted by using the rotating force acting on the steering-wheel-side housing 76 even though the system used in the clutch apparatus 29 operates normally. Then, in this case, permitting the relative rotation α, having an amount greater than or equal to a certain reference amount, enables the rotating force to be not only transmitted by using the rotation in one direction and but also cut off when rotated in the other direction. Thus, the use of the above-described clutch apparatus 29 for the vehicle steering apparatus 10 allows the two rotating shafts to be rotated relatively to each other in a situation where, for example, the assist control for the rotation is no longer required. As a result, the transmission of the rotating force is quickly cut off and therefore the steering feeling can be improved.

Also, a plurality of locking bars 80 include: a locking bar 803, which enters a lock groove 823 (see FIG. 6) as a first groove, which is any one of the plurality of lock grooves 82, regardless of a difference in rotational phases between the steering-wheel-side housing 76 and the tire-side housing 78, when the advancing/retreating mechanism 84 moves a plurality of locking bars 80 toward the lock grooves 82; and a locking bar 801, which enters a lock groove 821, which differs from the lock groove 823, when the locking bar 803 moves in either a clockwise or counterclockwise direction, with the locking bar 803 having entered the lock groove 823. The locking bar 803 is configured such that, while the locking bar 803 and the locking bar 801 have entered their corresponding lock grooves 823 and 821, a backlash between the locking bar 803 and a lateral surface (a lateral surface 82a shown in FIG. 6), which is one of two lateral surfaces of the lock groove 823, on one rotation direction side near the locking bar 801, is less than or equal to the first predetermined amount.

With this configuration and arrangement, a separate state (disconnected state), where the rotating force is not transmitted in between the steering-wheel-side housing 76 and the tire-side housing 78, can be set by retreating the locking bars 80 from the lock grooves 82 by using the advancing/retreating mechanism 84. On the other hand, when the steering-wheel-side housing 76 is rotated in one rotation direction (the arrow R3 direction shown in FIG. 6) in a state where the steering-wheel-side housing 76 and the tire-side housing 78 are clutch-connected to each other by the advancing/retreating mechanism 84, the locking bar 803 is engaged with a lateral surface (a lateral surface 82a shown in FIG. 6), which is one of two lateral surfaces of the lock groove 823, on the other rotation direction side. Thus, the rotating force can be quickly transmitted to the tire-side housing 78 with almost no backlash. Also, when the steering-wheel-side housing 76 is rotated in the other rotation direction (the arrow R4 direction shown in FIG. 6), the locking bar 801 is engaged with a lateral surface (a lateral surface 82b shown in FIG. 6), which is one of two lateral surfaces of the lock groove 821, on one rotation direction side. Thus, the rotating force can be quickly transmitted to the tire-side housing 78 with almost no backlash.

Also, a plurality of locking bars 80 include: a first locking bar (803) that enters a first lock groove (a lock groove 823 shown in FIG. 6), which is any one of a plurality of lock grooves regardless of a difference in rotational phases between the steering-wheel-side housing 76 and the tire-side housing 78, when the advancing/retreating mechanism 84 moves a plurality of locking bars 80 toward lock grooves 82; and a second locking bar (the locking bar 801 shown in FIG. 6), which enters the second lock groove (the lock groove 821 shown in FIG. 6), which differs from the first lock groove, when the first locking bar moves in either a clockwise or counterclockwise direction, with the first locking bar having entered the first lock groove, and is engaged with a lateral surface, which is one of two lateral surfaces of the first LOCK groove, on one rotation direction side.

For example, the locking bar 801 is configured such that when the locking bar 801 enters the lock groove 821, the locking bar 801 is engaged, with the backlash, which is less than or equal to the first predetermined amount, onto a lateral surface, which is one of two lateral surfaces of the lock groove 821, on the other rotation direction side. Thereby, a separate state (disconnected state), where the rotating force is not transmitted in between the steering-wheel-side housing 76 and the tire-side housing 78, can be set by retreating the locking bars from the lock grooves by using the advancing/retreating mechanism 84. On the other hand, when the steering-wheel-side housing 76 is rotated in one rotation direction in a state where the steering-wheel-side housing 76 and the tire-side housing 78 are connected to each other by the advancing/retreating mechanism 84, the locking bar 803 is engaged with the lateral surface 82a of the lock groove 823. Thus, the rotating force can be quickly transmitted to the tire-side housing 78 with almost no backlash. Also, when the steering-wheel-side housing 76 is rotated in the other rotation direction, the locking bar 801 is engaged with the lateral surface 82b of the lock groove 821. Thus, the rotating force can be quickly transmitted to the tire-side housing 78 with almost no backlash.

As described above, in the vehicle steering apparatus 10 equipped with the clutch apparatus 29, the steering-wheel-side housing 76 and the tire-side housing 78 can be rotated relatively to each other in a situation where, for example, the assist of the rotating force to the rack-and-pinion mechanism 34 is no longer required. This allows the transmission of the rotating force to be quickly cut off, so that the steering feeling can be improved.

Also, the vehicle steering apparatus 10 further includes the turning angle sensor 22, which detects information in response to the turning amount of the rack-and-pinion mechanism 34. The control apparatus 28 switches the clutch connection state to the unidirectional clutch connection state, based on at least one of the information (the angle of steering wheel) in response to the steering amount acquired from the steering angle sensor 14 and the information (the angle of tire) in response to the turning amount acquired from the turning angle sensor 22. Thereby, the assist control to the rack-and-pinion mechanism 34 using the steering actuator 30 and an operation of the steering wheel 12 can be quickly achieved or achieved by predicting it beforehand.

In the control apparatus 28 according to the present embodiment, the steering reaction force motor 18 is controlled by the steering ECU 28a, and the turning motor 24 is controlled by the turning ECU 28b. Where the two motors are driven by the separate ECUs as with this case, it is difficult to control the two motors in a coordinated manner because of the limited operation speeds and the limited communication rate between the ECUs. However, in the vehicle steering apparatus 10 according to the present embodiment, the rotating force produced by the steering reaction force motor 18 via the clutch apparatus 29 is transmitted to the turning actuator 32 only when the output by the turning motor 24 is deficient. In other words, the deficiency in the output by the turning motor 24 is always fed back to the steering ECU 28a, which controls the steering reaction force motor 18. As a result, the control interference between the two ECUs can be prevented as compared with the case where the steering reaction force motor 18 and the turning motor 24 are separately controlled by the two ECUs for the purpose of obtaining a desired turning force required for the controlling of the turning position.

As exemplified in the above-described embodiments, the clutch apparatus is configured such that at least one locking bar enters a lock groove when the power to the actuators is disconnected. Then, the clutch apparatus is configured such that at least one locking bar is definitely engaged into a lock groove by a rotating operation at the shifted angle δ, which is caused at the time of the connection, or below and such that another locking bar enters another lock groove. Then the two locking bars hold the lateral surfaces of the two different lock grooves, in between these locking bars, so that a locked state with almost no backlash can be achieved.

Note that the clutch apparatus will not be in a separate state under a high torque as in a friction clutch. Also, in the clutch apparatus, a plurality of locking bars can be moved in linkage with the movement of a single actuator, so that the locking bars can be easily synchronized with each other. Also, in the clutch apparatus, when the clutch is released (clutch OFF), the positions of all the locking bars are constrained, so that the locking bars can be stably secured. On the other hand, at the time of clutch connection (clutch ON), the positional restriction of the locking bars is lifted. Thereby, the locking bars are separately moved by the springs. Thus, the locking bars, which enter lock grooves, and the those not entering any of the lock grooves are separately moved.

Also, in the clutch apparatus according to the present embodiment, the rotary solenoid 92 is used as the advancing/retreating mechanism 84, and the pull-type solenoid 102 is used as the regulating mechanism 100. Thus, when the advancing/retreating mechanism 84 switches the clutch state between the clutch OFF state and the clutch ON state, each component practically does not move inside the clutch apparatus 29 in the shaft direction (the shaft direction of the shaft 102a). Thus, there is no need to take into account the interference with the regulating mechanism 100 moving in the shaft direction, when the advancing/retreating mechanism 84 switches the clutch state between the clutch OFF state and the clutch ON state. If both the advancing/retreating mechanism 84 and the regulating mechanism 100 use the rotary solenoids or the pull-type solenoids, the structure may possibly be complex or the overall size of the apparatus may possibly be increased because three connection states are achieved by a single clutch apparatus.

Also, in the vehicle steering apparatus 10 according to the present embodiment, the steering reaction force motor 18 used for the SBW control can also be used, for the assist control, through the operation of the clutch apparatus 29. This eliminates the use of a high-output turning motor or a plurality of turning motors, which is otherwise required in order to resolve the problem of insufficient torque occurring during stationary steering at the time the vehicle is at a stop or running at a low speed. This therefore contributes to reducing the cost of the vehicle steering apparatus 10.

The present invention has been described by referring to the above-described embodiments. However, the present invention is not limited to the above-described embodiments only, and those resulting from any appropriate combination or substitution of components in the embodiments are also effective as embodiments. Also, it is understood by those skilled in the art that modifications such as changes in the order of combination or processings made as appropriate in the embodiments or various changes in design may be added to the embodiments based on their knowledge and that the embodiments added with such modifications are also within the scope of the present invention.

In the above-described embodiments, a description has been given of the clutch apparatus in which the lock grooves are formed in an inner circumference of the steering-wheel-side housing and the locking bars are provided in the tire-side housing. Instead, the clutch apparatus may be configured such that the locking bars are provided in the steering-wheel-side housing and such that the lock grooves are formed in an outer circumference of the tire-side housing.

In the above-described embodiments, a plurality of assist lock pins 104 are driven by a single pull-type solenoid 102. Instead, a plurality of assist lock pins 104 may be separately driven by using two or more actuators. Then, the regulating mechanism 100 may select an assist lock pin or assist lock pins 104, which can quickly achieve the unidirectional clutch connection, based on the information on the angles of rotation of the steering-wheel-side housing 76 and the tire-side housing 78, and thereby may regulate the movement of some of the locking bars 80.

Although the number of assist lock pins 104 according to the above-described embodiments is less than that of locking bars 80 by one, the numbers thereof and the arrangements are not limited thereto and various other modifications are possible within a range in which the unidirectional clutch connection state can be achieved. Suppose, for example, there are a plurality of locking bars whose movement is not regulated by the assist lock pins 104. Then, in this example, any combination of locking bars may be suitable as long as the clutch apparatus is not in the bidirectional clutch connection state with the applicable locking bar having entered a lock groove.

More specifically, in the layout of the plurality of locking bars 801 to 806 shown in FIG. 6, the number of assist lock pins 104 in the regulating mechanism 100 and the arrangement thereof may preferably be set as follows. That is, the number thereof and the arrangement thereof may be set such that when control, for which the unidirectional clutch connection is required, is to be performed, the combination of locking bars entering a lock groove is neither the combination of the locking bar 801 and the locking bar 803, the combination of the locking bar 802 and the locking bar 805, the combination of the locking bar 803 and the locking bar 805, nor the combination of the locking bar 804 and the locking bar 806.

In the above-described embodiments, the same locking bar 80 or the same locking bars 80 is/are used for both the unidirectional clutch connection state and the bidirectional clutch connection state. Instead, a locking bar driven during the unidirectional clutch connection state (assist control) and a locking bar driven during the bidirectional clutch connection state (fail-safe control) may be provided separately. Then the actuators used for the respective controls may be provided separately.

DESCRIPTION OF THE REFERENCE NUMERALS

10 Vehicle steering apparatus
12 Steering wheel
13 Main shaft
14 Steering angle sensor
16 Torque sensor
18 Steering reaction force motor
20 Intermediate shaft
22 Turning angle sensor
24 Turning motor
28 Control apparatus
28a Steering ECU
28b Turning ECU
29 Clutch apparatus
30 Steering actuator
32 Turning actuator
34 Rack-and-pinion mechanism
76 Steering-wheel-side housing
78 Tire-side housing
80 Locking bar
80a Recess
80b Notched groove
82 Lock groove
82a, 82b Lateral surface
83 Protrusion
84 Advancing/retreating mechanism
92 Rotary solenoid 94 Pin
96 Turntable
100 Regulating mechanism
102 Pull-type solenoid
104 Assist lock pin
106 Adapter
108 Assist lock groove
801, 802, 803, 804, 805, 806 Locking bar
821, 823 Lock groove

INDUSTRIAL APPLICABILITY

The present invention can be used for a steering apparatus for a vehicle.

What is claimed is:

1. A clutch apparatus for switching transmission and cutoff of a rotating force between two rotating shafts, the clutch apparatus comprising:
    a first rotating shaft formed circumferentially such that a plurality of grooves are formed mutually at intervals in an inner or outer circumference;
    a second rotating shaft arranged such that the second rotating shaft is placed coaxially with the first rotating shaft and such that at least part of the second rotating shaft overlaps with the first rotating shaft;
    a plurality of engagement portions arranged in a circumferential direction of the second rotating shaft such that the plurality of engagement portions are placed mutually at intervals, the engagement portions being so provided in the second rotating shaft as to be movable in a radial direction of the second rotating shaft;
    an advancing/retreating mechanism that advances and retreats the engagement portions toward and away from the grooves; and
    a regulating mechanism that regulates movement of at least one of the engagement portions, when the advancing/retreating mechanism moves the plurality of engagement portions toward the grooves,
    wherein the plurality of engagement portions and the plurality of grooves are so configured as to achieve a first engagement state and a second engagement state,
    the first engagement state being a state of the engagement portions and the grooves where the two rotating shafts are locked with each other, with a backlash, which is less than or equal to a first predetermined amount, such that a predetermined combination of two engagement portions enter their corresponding grooves in the plurality of grooves by the advancing/retreating mechanism, whereby the rotating force is transmittable for a rotation in both directions, and
    the second engagement state being a state thereof where a relative rotation having a second predetermined amount, which is greater than the first predetermined amount, is allowed between the two rotating shafts such that the advancing/retreating mechanism restricts a movement of one of the predetermined combination of two engagement portions into the groove.

2. The clutch apparatus according to claim 1, the plurality of engagement portions including:
    a first engagement portion that enters a first groove, which is any one of the plurality of grooves, regardless of a difference in rotational phases between the first rotating shaft and the second rotating shaft, when the advancing/retreating mechanism moves the plurality of engagement portions toward the plurality of grooves; and
    a second engagement portion that enters a second groove, which differs from the first groove, when the first engagement portion moves in either a clockwise or counterclockwise direction with the first engagement portion having entered the first groove,
    wherein the first engagement portion is configured such that, while the first engagement portion and the second engagement portion have entered their corresponding grooves, a backlash between the first engagement portion and a lateral surface, which is one of two lateral surfaces of the first groove, on one rotation direction side near the first engagement portion, is less than or equal to the first predetermined amount.

3. The clutch apparatus according to claim 1, the plurality of engagement portions including:
    a first engagement portion that enters a first groove, which is any one of the plurality of grooves regardless of a difference in rotational phases between the first rotating shaft and the second rotating shaft, when the advancing/retreating mechanism moves the plurality of engagement portions toward the grooves; and
    a second engagement portion that enters a second groove, which differs from the first groove, when the first engagement portion moves in either a clockwise or counterclockwise direction, with the first engagement portion having entered the first groove, and is engaged with a lateral surface, which is one of two lateral surfaces of the first groove, on one rotation direction side,
    wherein the second engagement portion is configured such that when the second engagement portion enters the second groove, the second engagement is engaged, with the backlash, which is less than or equal to the first predetermined amount, onto a lateral surface, which is one of two lateral surfaces of the second groove, on the other rotation direction side.

4. The clutch apparatus according to claim 2, the advancing/retreating mechanism including:
    an actuator driven by electricity; and
    a biasing member that biases the engagement portion toward the groove,
    wherein an operation of the actuator, which is turned on, causes the engagement portion to be retreated from the groove by a force, which is larger than the biasing force of the biasing member,
    when the actuator is turned off, the first engagement portion enters the first groove by the biasing force of the biasing member.

5. The clutch apparatus according to claim 4, wherein the actuator is a rotary solenoid, and
    wherein the advancing/retreating mechanism further includes a conversion mechanism for converting a rotary motion of the rotary solenoid so as to advance and retreat the engagement portion.

6. The clutch apparatus according to claim 1, wherein the engagement portions and the grooves are so provided to satisfy $$P = 360/n,$$

$$B1 \approx W + (\delta \times (Nx-1)), \text{ and}$$

$$\delta = P/N,$$

where n indicates the number of grooves (the plurality n of the grooves), P indicates a pitch of the grooves, N indicates the number of engagement portions (the plurality N of the engagement portions), Nx indicates the number of engagement portions entering a plurality of the grooves, W indicates width of the engagement portion, B1 indicates width of the groove, B2 indicates a distance between the groove and a groove adjacent thereto, and δ indicates a shifted angle formed when the engagement portion is engaged into the groove.

7. A steering apparatus comprising:
an operating member rotated to steer a vehicle;
a steering actuator that enables a steering-side reaction force to be generated by generating a rotating force transmitted to the operating member;
a steering amount detector that detects information in response to a steering amount of the operating member;
a turning mechanism that turns wheels,
a turning actuator that enables the turning-side wheels to be turned by generating a rotating force transmitted to the turning mechanism,
a clutch apparatus according to claim 1, placed between the operating member and the turning mechanism, which switches transmission and cutoff of the rotating force between the operating member and the turning mechanism; and
a control apparatus that not only performs control such that the steering-side reaction force is generated by the steering actuator in response to an input to the operating member, while the rotating force between the first rotating shaft and the second rotating shaft is being cut off by the clutch apparatus, but also controls a turning position on a turning side, based on information in response to a steering amount of the operating member,
wherein the control apparatus controls a switching such that the clutch apparatus is in the second engagement state, based on information, predicting that an output of the turning actuator required for a controlling of the turning position by the turning actuator will be deficient, or information indicating that the output thereof is actually deficient.

8. The steering apparatus according to claim 7, further comprising a turning amount detector that detects information in response to a turning amount of the turning mechanism,
wherein the control apparatus performs control such that the clutch apparatus is switched to the second engagement state, based on at least one of the information in response to the steering amount and the information in response to the turning amount.

* * * * *